(12) United States Patent
Cosby et al.

(10) Patent No.: US 10,933,969 B2
(45) Date of Patent: Mar. 2, 2021

(54) PUCK ATTACHMENT MECHANISM FOR FLEXIBLE AIRCRAFT CONFIGURATION

(71) Applicant: Bell Helicopter Textron Inc., Fort Worth, TX (US)

(72) Inventors: Ross D. Cosby, Mansfield, TX (US); Carl A. May, Mansfield, TX (US); Richard Theodore Perryman, Fort Worth, TX (US); Michael Stephen Deslatte, Saginaw, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 978 days.

(21) Appl. No.: 15/405,246

(22) Filed: Jan. 12, 2017

(65) Prior Publication Data

US 2018/0194451 A1   Jul. 12, 2018

(51) Int. Cl.
| | |
|---|---|
| *B64C 1/20* | (2006.01) |
| *B64D 11/06* | (2006.01) |
| *B64C 1/22* | (2006.01) |
| *B64C 1/12* | (2006.01) |
| *F16B 5/01* | (2006.01) |
| *B64C 1/00* | (2006.01) |
| *F16B 2/12* | (2006.01) |

(52) U.S. Cl.
CPC ............. *B64C 1/20* (2013.01); *B64C 1/12* (2013.01); *B64C 1/22* (2013.01); *B64D 11/0601* (2014.12); *B64D 11/0696* (2013.01); *F16B 5/01* (2013.01); *B64C 2001/0072* (2013.01); *F16B 2/12* (2013.01); *Y02T 50/46* (2013.01)

(58) Field of Classification Search
CPC .... B64C 1/18; B64C 1/20; B64C 1/22; B64D 11/06; B64D 11/0601; B64D 11/0696; F16B 5/01
See application file for complete search history.

(56) References Cited

U.S. PATENT DOCUMENTS

| | | |
|---|---|---|
| 2,559,548 A | 7/1951 | Seigneur |
| 2,957,196 A | 10/1960 | Kreider et al. |
| 3,017,673 A | 1/1962 | Biris |

(Continued)

FOREIGN PATENT DOCUMENTS

| | | |
|---|---|---|
| CN | 201354072 | 12/2009 |
| DE | 826549 | 1/1952 |

(Continued)

OTHER PUBLICATIONS

EPO Examination Report issued in EP Application Serial No. 17185780.8 dated Apr. 26, 2019, 5 pages.

(Continued)

*Primary Examiner* — Benjamin P Lee
(74) *Attorney, Agent, or Firm* — Patent Capital Group

(57) ABSTRACT

In one embodiment, an apparatus may comprise an attachment device configured to be embedded in a structure, wherein the attachment device comprises: a body comprising a first flange and a second flange, wherein the body is configured such that the first flange and the second flange are coupled together internally within the body when the attachment device is embedded in the structure; an attachment fitting for coupling a component to the structure in which the attachment device is embedded.

19 Claims, 31 Drawing Sheets

(56) References Cited

U.S. PATENT DOCUMENTS

| | | | | |
|---|---|---|---|---|
| 3,579,942 A | * | 5/1971 | Cole | F16B 5/01 411/113 |
| 3,892,099 A | | 7/1975 | Worgan et al. | |
| 4,501,404 A | | 2/1985 | Nelson | |
| 4,577,450 A | | 3/1986 | Large | |
| 5,240,543 A | * | 8/1993 | Fetterhoff | F16B 5/01 156/293 |
| 5,259,575 A | | 11/1993 | Cabrera | |
| 6,152,401 A | | 11/2000 | Green | |
| 6,264,412 B1 | * | 7/2001 | Nakamura | F16B 5/01 411/107 |
| 6,488,460 B1 | * | 12/2002 | Smith | F16B 5/01 411/339 |
| 7,578,551 B2 | | 8/2009 | Liñero | |
| 8,336,939 B2 | | 12/2012 | Green et al. | |
| 8,544,796 B2 | | 10/2013 | Pozzi et al. | |
| 8,568,072 B2 | * | 10/2013 | Suefuji | F16B 37/122 411/303 |
| 8,709,584 B2 | * | 4/2014 | Carstensen | B64D 9/003 244/133 |
| 9,140,279 B2 | * | 9/2015 | Frias | F16B 5/01 |
| 9,764,663 B2 | | 9/2017 | Lee | |
| 9,862,166 B2 | * | 1/2018 | Lopez | B32B 3/12 |
| 9,976,583 B2 | * | 5/2018 | Lopez | B32B 7/08 |
| 10,197,078 B2 | * | 2/2019 | Richardson | F16B 5/0208 |
| 10,604,262 B2 | | 3/2020 | Carr et al. | |
| 10,625,866 B2 | | 4/2020 | Emrich et al. | |
| 2003/0143052 A1 | | 7/2003 | Fehrle et al. | |
| 2003/0209929 A1 | | 11/2003 | Muin et al. | |
| 2004/0195450 A1 | | 10/2004 | Hiesener | |
| 2005/0001098 A1 | | 1/2005 | Saint-Jalmes | |
| 2007/0040434 A1 | | 2/2007 | Plant | |
| 2007/0193146 A1 | * | 8/2007 | Carstensen | B64D 9/003 52/268 |
| 2008/0213034 A1 | | 9/2008 | Wood et al. | |
| 2008/0231092 A1 | | 9/2008 | Silva | |
| 2010/0327123 A1 | | 12/2010 | Smith et al. | |
| 2011/0042514 A1 | | 2/2011 | Ehlers et al. | |
| 2011/0220267 A1 | * | 9/2011 | Blancaneaux | C08L 63/00 156/78 |
| 2014/0265513 A1 | | 9/2014 | Lambert | |
| 2015/0048206 A1 | | 2/2015 | Deloubes | |
| 2015/0210393 A1 | | 7/2015 | Savian | |
| 2015/0336485 A1 | | 11/2015 | Lee | |
| 2015/0360779 A1 | * | 12/2015 | Behrens | B64D 1/22 244/137.4 |
| 2016/0107753 A1 | | 4/2016 | Toktas et al. | |
| 2017/0036750 A1 | * | 2/2017 | Lewis | B64C 1/12 |
| 2017/0080674 A1 | * | 3/2017 | Patel | F16B 5/01 |
| 2017/0253006 A1 | * | 9/2017 | Lopez | B32B 3/12 |
| 2018/0038399 A1 | * | 2/2018 | Fischer | F16B 5/01 |
| 2018/0194473 A1 | | 7/2018 | Emrich et al. | |
| 2018/0194478 A1 | | 7/2018 | Carr et al. | |
| 2018/0327074 A1 | * | 11/2018 | Mills | B64C 1/18 |
| 2019/0009882 A1 | * | 1/2019 | Mills | B64C 1/20 |
| 2019/0092478 A1 | * | 3/2019 | Gilbert | B64C 1/20 |

FOREIGN PATENT DOCUMENTS

| | | |
|---|---|---|
| EP | 2783984 A1 | 10/2014 |
| EP | 3348469 A1 | 7/2018 |
| EP | 3348475 A1 | 7/2018 |
| EP | 3348479 A1 | 7/2018 |
| EP | 3348475 B1 | 3/2020 |
| EP | 3348469 B1 | 4/2020 |
| GB | 2307671 A | 6/1997 |
| WO | 2011077366 A1 | 6/2011 |
| WO | 2015094968 A1 | 6/2015 |

OTHER PUBLICATIONS

EPO Examination Report issued in EP Application Serial No. 17185780.8 dated Sep. 28, 2018, 5 pages.

Anonymous: Pilot's Operating Handbook: Cessna 1978—Skyhawk Cessna Model 172N, Jan. 1, 1977 (Jan. 1, 1977), XP055313879, Wichita, Kansas USA, Retrieved from the Internet: URL:https://www.flyingd.net/documents/N739EF_172N_POH_000.pdf [retrieved on Oct. 25, 2016] * Section 7, "Seats" and "Entrance Doors and Cabin Windows"*.

Anonymous: "Sky Shuttle—Helicopter service between Macau and Hong Kong or Shenzhen," Wodani—Helicopters, Transportation, Jul. 13, 2009 (Jul. 13, 2009), XP002778626, Retrieved from the Internet: URL:https://wodani.wordpress.com/2009/07/13/sky-shuttle-helicopter-service-between-macau-and-hong-kong-or-macau-and-shenzhen/ [retrieved on Feb. 27, 2018] *AgustaWestlandand AW139 Cabin Seating Plan*.

EPO Examination Report issued in EP Application Serial No. 17185780.8 dated Apr. 3, 2018, 6 pages.

EPO Examination Report issued in EP Application Serial No. 17185783.2 dated Mar. 27, 2018, 7 pages.

EPO Search Report issued in EP Application Serial No. 17185779.0 dated Mar. 19, 2018, 4 pages.

EPO Search Report issued in EP Application Serial No. 17185780.8 dated Mar. 14, 2018, 6 pages.

EPO Search Report issued in EP Application Serial No. 17185783.2 dated Mar. 12, 2018, 5 pages.

EPO Examination Report mailed in EP Application Serial No. 17185779.0 dated Feb. 13, 2019, 5 pages.

EPO Examination Report issued in EP Application Serial No. 17185779.0 dated Jun. 15, 2018, 7 pages.

EPO Search Report issued in EP Application Serial No. 17185783.2 dated Sep. 12, 2018, 7 pages.

N.N.N.N.: "Cutaway ML MI-8" In: "Cutaway MIL MI-8," Feb. 23, 2014 (Feb. 23, 2014),http://3.bp.blogspot.com/-MZJpilssl6s/UFLTtzrG0ml/AAAAAAAAEr0/BIYZxL2Ulow/s1600/Mi-8TB-Cutaway-Untitled-1_003.jpg, XP055504429, pp. 1-1.

EPO Examination Report issued in EP Application 18184588.4 dated Mar. 8, 2019, 6 pages.

EPO Search Report issued in EP Application 18184588.4 dated Feb. 21, 2019, 4 pages.

AirTeamImages.com, "Agusta Westland AW-189," Feb. 13, 2012, https://www.airteamimages.com/agustawestland-aw-189__agustawestland_143375.html; 4 pages.

USPTO Non-Final Office Action for U.S. Appl. No. 15/405,271 dated Jul. 11, 2019, 9 pages.

USPTO Non-Final Office Action for U.S. Appl. No. 15/405,284 dated Jun. 24, 2019, 14 pages.

* cited by examiner

PUCK ATTACHMENT MECHANISM FOR FLEXIBLE AIRCRAFT CONFIGURATION

TECHNICAL FIELD

This disclosure relates generally to aircraft configurations, and more particularly, though not exclusively, to flexible configuration of aircraft fixtures.

BACKGROUND

There are many different types of aircraft available for a variety of different purposes. The various types of aircraft may require a variety of different fixtures and associated configurations, such as seating and furniture fixtures in the aircraft interiors. The configuration of aircraft fixtures may vary greatly based on various factors, including the type of aircraft, the purpose of the aircraft, and any other needs or requirements of an aircraft operator (such as business and/or legal related requirements), among other examples.

SUMMARY

According to one aspect of the present disclosure, an apparatus may comprise an attachment device configured to be embedded in a structure, wherein the attachment device comprises: a body comprising a first flange and a second flange, wherein the body is configured such that the first flange and the second flange are coupled together internally within the body when the attachment device is embedded in the structure; an attachment fitting for coupling a component to the structure in which the attachment device is embedded.

DETAILED DESCRIPTION

Figure 1:
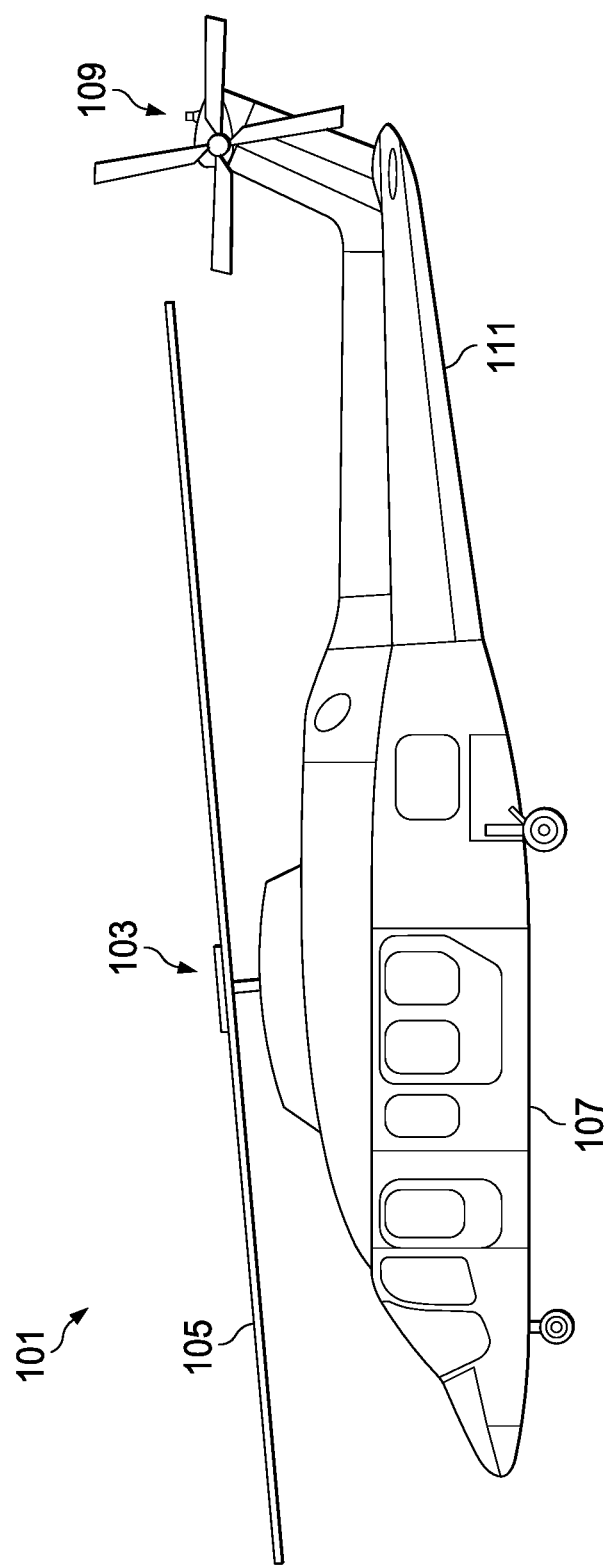
FIGS. 1 and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 2:
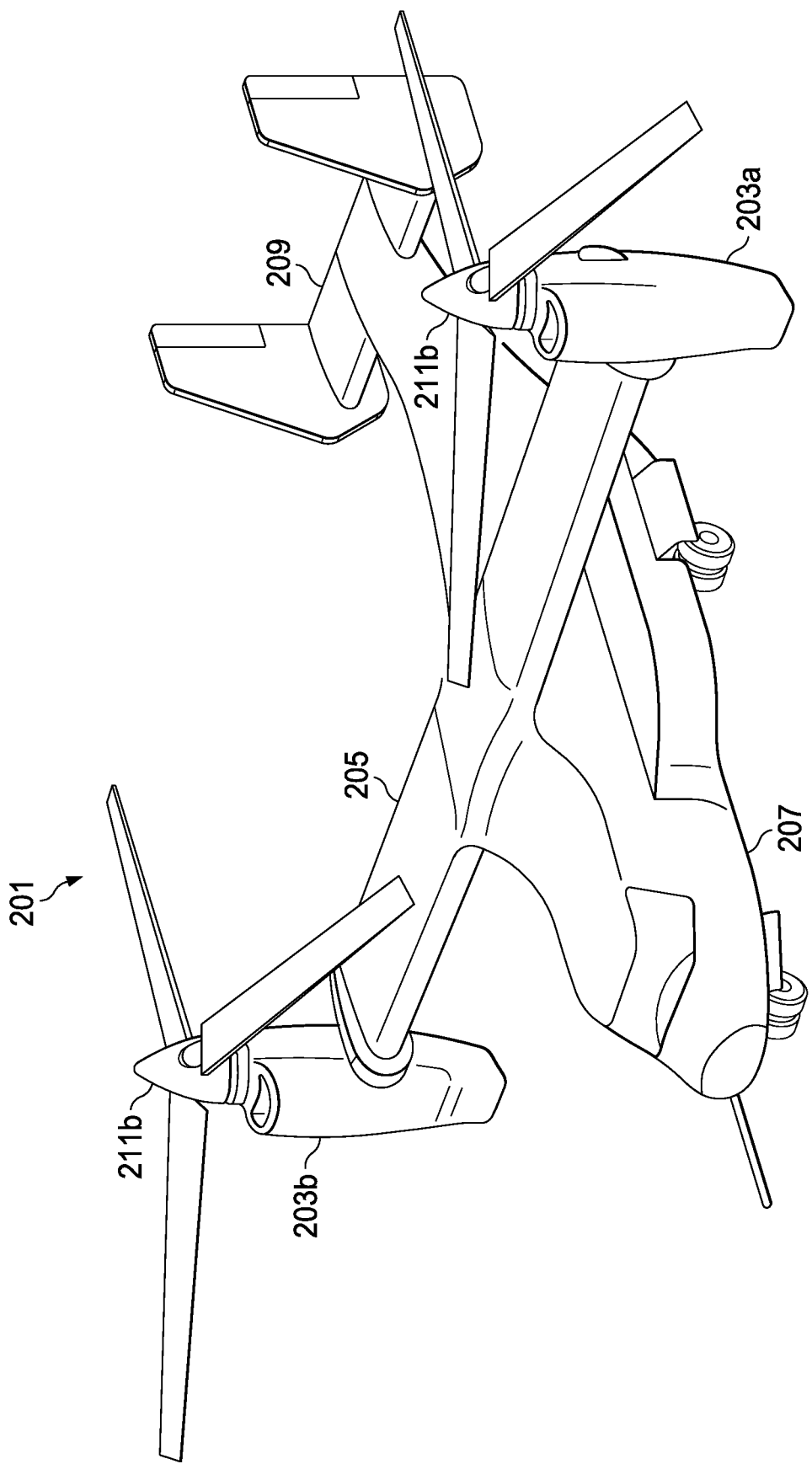

FIGS. 1 and 2 illustrate example aircraft in accordance with certain embodiments, as discussed further below.

FIG. 1 illustrates a side view of an example rotorcraft 101. Rotorcraft 101 has a rotor system 103 with a plurality of rotor blades 105. The pitch of each rotor blade 105 can be managed or adjusted in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 using at least one engine.

FIG. 2 illustrates a perspective view of an example tiltrotor aircraft 201. Tiltrotor aircraft 201 can include nacelles 203a and 203b, a wing 205, a fuselage 207, and a tail member 209. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

There are many different types of aircraft available for a variety of different purposes. The various types of aircraft may require a variety of different fixtures and associated configurations, such as seating and furniture fixtures in the aircraft interiors. The configuration of aircraft fixtures may vary greatly based on various factors, including the type of aircraft, the purpose of the aircraft, and any other needs or requirements of an aircraft operator (such as business and/or legal related requirements), among other examples. For example, fixed wing airplanes and rotorcraft (e.g., helicopters) may be used for commercial and/or private travel, cargo transportation, military purposes, and oil and gas exploration, among other examples. The interior configurations of these aircraft (e.g., seating and furniture configurations) typically vary based on the type and purpose of each aircraft. For example, the number, size, and arrangement of seats in an aircraft may vary. Aircraft used for commercial travel (e.g., airplanes), for example, may require more seats than aircraft used for private travel, corporate travel, or oil and gas exploration, among other examples. Moreover, aircraft used for corporate or private travel may require custom configurations of seats and/or other interior fixtures, such as tables, cabinets, storage compartments, desks, office equipment and furniture, entertainment equipment and furniture, and beds, among other examples. Certain types and/or uses of aircraft may also be subject to business and/or legal constraints that impact the interior configuration required for the aircraft, such as government safety regulations. For example, certain aircraft may be subject to government regulations relating to seating configuration, emergency exits, and cargo or luggage storage, such as regulations issued by the Federal Aviation Administration (FAA). Transport rotorcraft (e.g., helicopters), for example, may be subject to FAA regulations associated with the number of seats, seat and aisle spacing, access to emergency exits, and so forth (e.g., as set forth by various regulations from 14 C.F.R. § 29). As another example, rotorcraft used for oil and gas exploration may be subject to OGP operator standards (e.g., enhanced safety standards) for operations pursued under the International Association of Oil and Gas Producers (the IOGP or OGP).

In some cases, aircraft interiors may be configured using rail-based attachment mechanisms, such as seat rails for attaching seats to the floor of an aircraft. Certain rail-based approaches, however, may suffer from various drawbacks. For example, because rails typically must be attached to the appropriate surface (e.g., an aircraft floor) during the production or fabrication stage, the arrangement of rails is fixed and cannot be easily reconfigured. Moreover, once a particular arrangement or configuration of fixtures (e.g., rail-based seats) is attached to the rails, it may be difficult to reconfigure the arrangement of fixtures. For example, in some cases, reconfiguring rail-based fixtures may require all or many of the existing fixtures to be removed from the rails in order to add, remove, and/or rearrange fixtures on the rails (e.g., by sliding the existing fixtures off the rails, and then sliding fixtures back on the rails using a new fixture arrangement). In addition, because rails often span the entire surface area where any fixtures will be attached, rails often provide unnecessary attachment points that may never be used, thus increasing the weight of an aircraft. Rails may also protrude above the surface in which they are installed, rendering them less safe and more susceptible to damage than attachment mechanisms embedded within a surface. Although some rails may be embedded within certain types of surfaces rather than protruding from the surface, that can often be problematic for certain aircraft, such as a rotorcraft with fuel lines spanning the floor. Accordingly, in some cases, there may be various drawbacks associated with rail-based attachment mechanisms for aircraft fixtures. Moreover, other attachment mechanisms used for aircraft fixtures may suffer from similar deficiencies.

The present disclosure describes various embodiments for enabling flexible configuration of aircraft fixtures. For example, in some embodiments, "puck" fastener or attachment mechanisms may be used to attach fixtures to an aircraft. A puck, for example, may be a cylindrical or puck shaped mechanism that can be installed in a variety of locations in an aircraft and that provides attachment point(s) for fixtures. Pucks may be used to attach any type of fixture to an aircraft, including but not limited to, furniture (e.g., seats, tables, cabinets, storage compartments, desks, computer stands, beds), office or entertainment equipment, cargo storage mechanisms (e.g., for secure lock-down of baggage and cargo), and litter kits, among other examples. Moreover, pucks may be used to install fixtures in any location of an aircraft, including the main cabin, the baggage or cargo bay, the walls or roof, and even the aircraft exterior (e.g., for cargo nets, wing tie-downs, and other external features).

Pucks can be installed in an aircraft using a variety of configurations, and the particular configuration may depend on the type of aircraft, the purpose of the aircraft, the particular fixtures that will be installed in the aircraft, and any other needs or requirements of an aircraft operator (such as business and/or legal related requirements), among other examples. In some cases, pucks may be used to enable flexible seating and furniture configurations in aircraft interiors, including varying numbers of seats and various seating arrangements. For example, in some cases, rotorcraft may use pucks to provide seating configurations for a variable number of passengers, such as seating configurations ranging from 16 to 20 passengers. In addition, rotorcraft used for oil and gas exploration may use pucks to enable seating configurations that comply with FAA and OGP standards. In some cases, pucks may be used to install particular seating arrangements and/or foldover seats in an aircraft or rotorcraft, for example, to facilitate access to the exits in a manner that complies with OGP standards (and/or any other standards, requirements, or regulations). Moreover, rotorcraft used for corporate, private, and/or VIP travel may use pucks to enable various custom seating and furniture configurations (e.g., as desired by the operator and/or passengers).

The embodiments described throughout this disclosure provide numerous technical advantages, including flexible and reconfigurable arrangements of aircraft fixtures, seating arrangements for a variable number of passengers (e.g., in a manner that complies with OGP standards), and custom seating and furniture arrangements for private, corporate, and VIP travel, among other examples. Moreover, pucks are also lighter (e.g., thus reducing the weight of aircraft), more cost-efficient, and less susceptible to damage than other aircraft attachment mechanisms (e.g., rails). As an example, multiple discrete pucks can be installed in order to attach a fixture that would otherwise require installation of an entire rail-based attachment mechanism. Installation of multiple discrete pucks rather than a long rail-based mechanism may result in a lightweight and cheaper solution. Moreover, because pucks can be embedded within and/or flush with the surface in which they are installed, attachment points can be added to a surface without compromising the flat nature of the surface. Similarly, unused pucks can be plugged with a puck cover or plug, flush with the surface in which they are embedded, thus enabling flexible puck-based configurations to be installed in a surface while preserving its flat nature. Moreover, the embedded and/or flush installation of pucks renders them more resilient to damage than other attachment mechanisms, such as rails that may protrude above the surface in which they are installed. In addition, replacing a damaged puck may be easier and cheaper than replacing other attachment mechanisms, such as rail-based mechanisms, which may require an entire rail to be replaced even if the damage is limited to only a particular portion of the rail.

Example embodiments that may be used to implement flexible configuration of aircraft fixtures are described below with more particular reference to the remaining FIGURES.

Figure 3A:
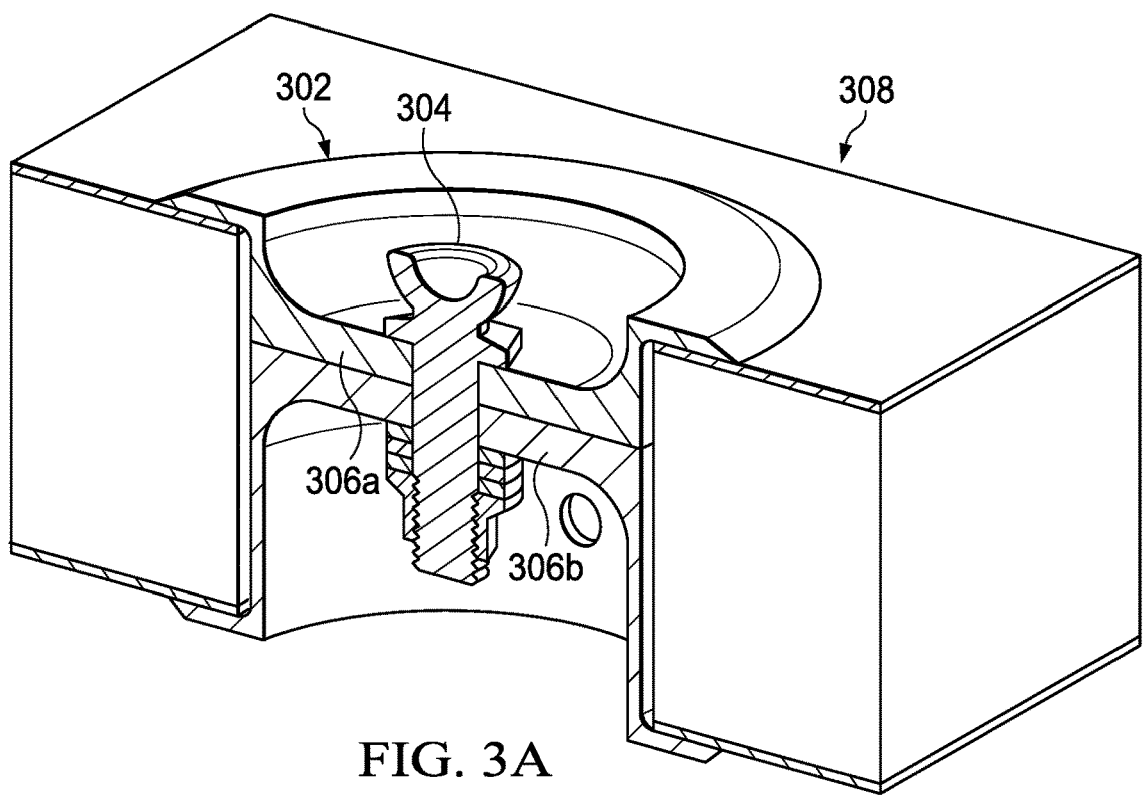
FIGS. 3A-C illustrate examples embodiments of pucks for enabling flexible configuration of aircraft fixtures.
Figure 3B:
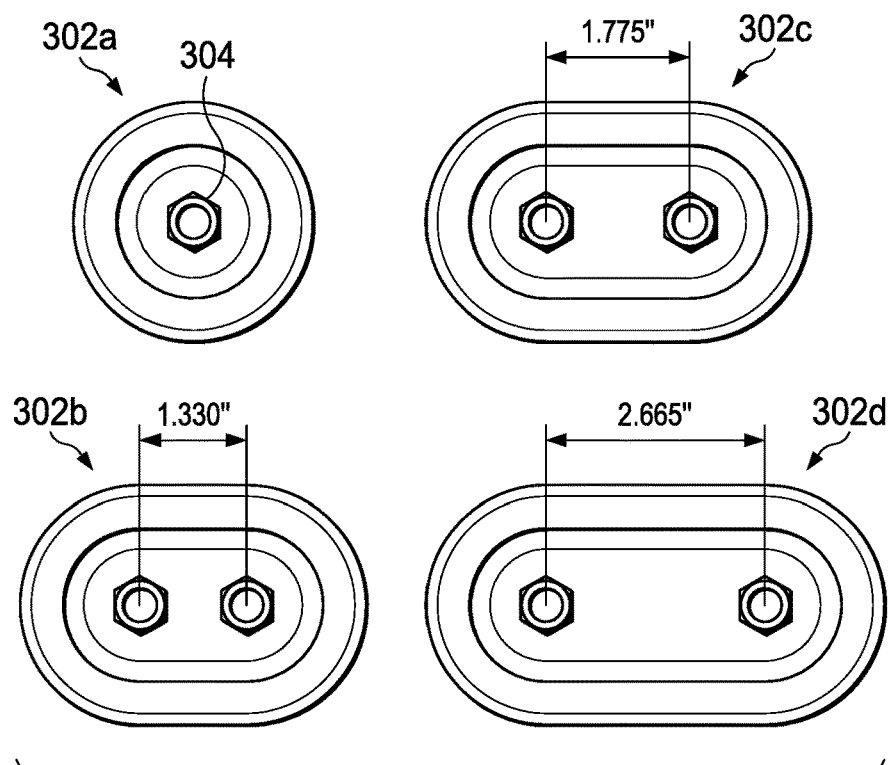
Figure 3C:
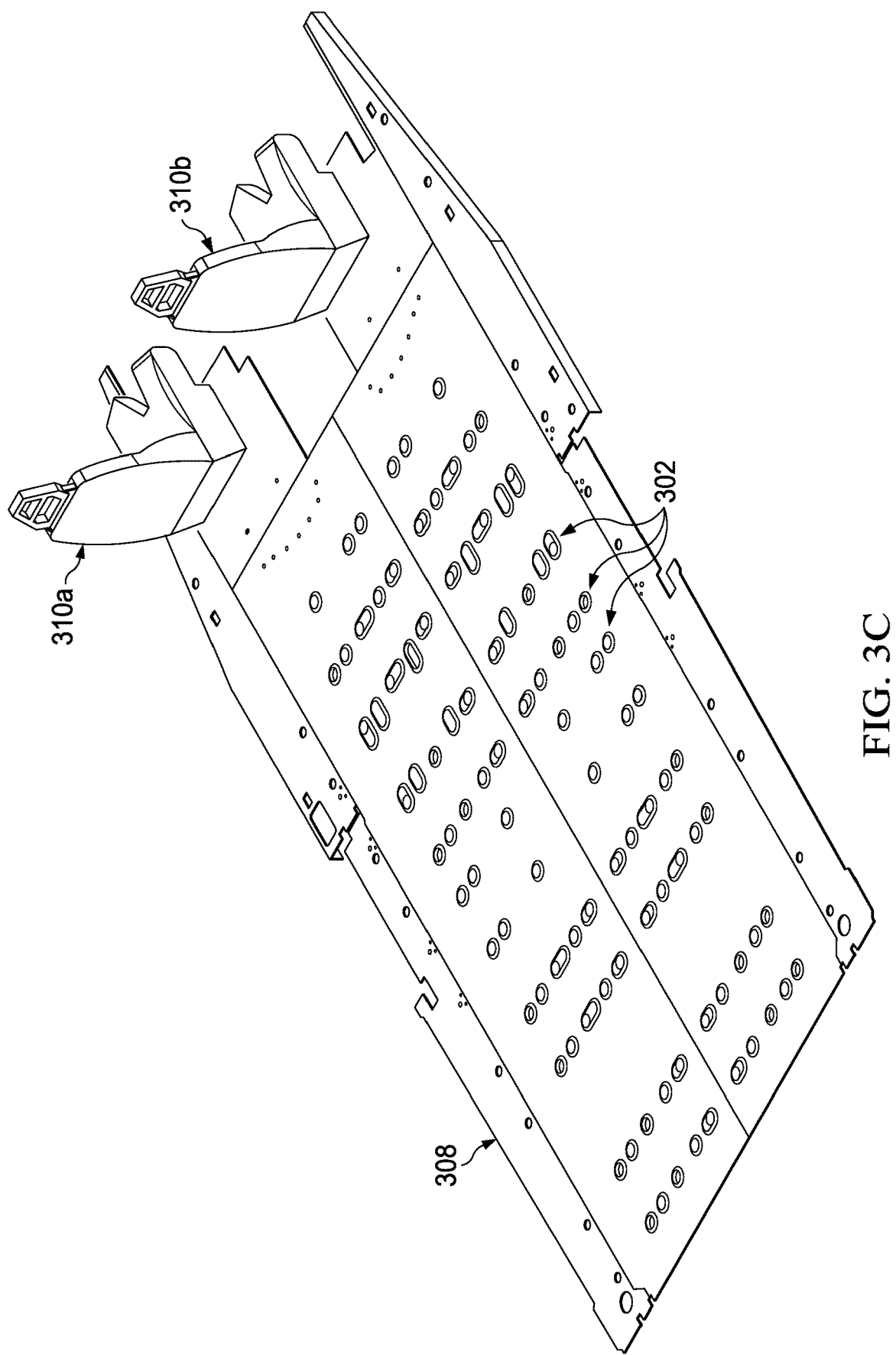

FIGS. 3A-C illustrate example embodiments of pucks for enabling flexible configuration of aircraft fixtures.

FIG. 3A illustrates an example embodiment of a puck 302. In the illustrated embodiment, puck 302 is installed in surface or structure 308. In some embodiments, for example, surface 308 may be a surface or structure of an aircraft, such as the floor panel of a rotorcraft. In some embodiments, surface 308 may comprise a composite core, such as a honeycomb or foam core. In other embodiments, however, any suitable type of surface 308 may be used.

In the illustrated embodiment, puck 302 includes an attachment point 304. Attachment point 304, for example, may be used as an attachment point for components attached to the surface or structure 308 in which the puck 302 is embedded, such as fixtures installed on a surface of an aircraft. For example, a fixture may include a corresponding attachment point or fitting that can be mechanically clamped down on attachment point 304 of puck 302. Thus, a fixture may be installed by clamping down its attachment point(s) to the attachment point(s) 304 of one or more pucks 302. In some embodiments, for example, attachment point 304 of puck 302 may include a stud fastened to puck 302 using mechanical fasteners (e.g., a locking nut and washers), and the stud of puck 302 may interface with a corresponding attachment point of a particular fixture (e.g., a seat or payload fitting). Moreover, in some embodiments, a puck 302 may include multiple attachment points 304.

In the illustrated embodiment, puck 302 also includes flanges 306a and 306b. In some embodiments, for example, puck 302 may be formed from two adjacent and internal flanges 306. For example, puck 302 may be formed using two vertically arranged components that each include a flange 306, with the flanges 306 situated internally and adjacent to each other when the puck is embedded within a particular surface or structure 308. Flanges 306, for example, may each include an internal ridge or rim that provides structural support and strength when puck 302 is used as an attachment point for a fixture. For example, when a fixture is attached to puck 302, flanges 306 may provide a load path for transferring and/or shearing the load over a given area of the core or surface 308 in which the puck in installed. In some cases, the two components with flanges 306 may be distinct or separable parts of puck 302.

In some embodiments, a puck 302 may be installed in a particular surface 308 by first drilling a hole in the surface 308, and then placing the two flange 306 components of the puck 302 in the hole, with the flanges 306 arranged adjacently in the hole and with the attachment point 304 in the center. In this manner, puck 302 can be mechanically clamped or installed in the drilled hole, thus avoiding the need to use an adhesive bond to hold the puck 302 in place. In some embodiments, however, an adhesive bond may still be used or injected, for example, in order to seal any gaps (e.g., to prevent moisture). In this manner, pucks 302 can be installed in a particular surface 308 even after the surface has been fabricated or manufactured. For example, in some cases, blank floor panels for rotorcraft could be fabricated or manufactured, and then pucks 302 could be subsequently installed in the floor panels using the appropriate configuration (e.g., using a configuration desired by a particular rotorcraft operator).

Once installed, pucks 302 may be used to attach fixtures to the surface 308 in which they are installed (e.g., for attaching seats to the floor of an aircraft). For example, in some embodiments, fixtures may include attachment points, such as claw-based attachment fittings, which can be mechanically clamped down on the corresponding attachment points 304 of pucks 302. Thus, fixtures can be installed by clamping down their attachment points to the appropriate attachment points 304 of the pucks 302. Fixtures can similarly be removed by disconnecting the fixture attachments points from the corresponding attachment points 304 of the pucks 302. In this manner, the configuration of fixtures (e.g., seating configurations) can be easily modified, for example, by adding, removing, and/or rearranging certain fixtures, as desired. Thus, pucks 302 may enable fixtures to be configured in a more flexible manner than is possible using other attachment mechanisms, such as rail-based mechanisms, which may require all or many of the existing fixtures to be removed from the rails in order to add, remove, and/or rearrange certain fixtures on the rails (e.g., by sliding the existing fixtures off the rails, and then sliding fixtures back on the rails using a new fixture arrangement).

Pucks 302 may also enable attachment points to be added to a particular surface 308 without compromising the flat nature of the surface, given that pucks 302 can be embedded within the surface 308 in which they are installed. Moreover, unused pucks 302 can be plugged with a puck cover or plug, flush with the surface in which the puck is embedded within, in order to similarly preserve the flat nature of the surface 308 in which they are embedded, while also preserving the ability to subsequently reconfigure an arrangement of fixtures using the previously unused pucks 302. In some embodiments, puck covers may be created from a polymer-based material, such as a nylon polymer, using selective laser sintering (SLS). In other embodiments, puck covers may be created using injection molded plastics and/or other injection molded materials. Any suitable material and/or manufacturing method, however, can be used to create puck covers.

FIG. 3B illustrates examples of pucks with different sizes, numbers of attachment points, and spacing between the attachment points. In some embodiments, for example, certain fixture configurations may require pucks with varying sizes, numbers of attachment points, and spacing between the attachment points, depending on the desired fixture configuration. For example, in some cases, certain fixture configurations may require multiple attachment points in close proximity, and thus a puck with two or more attachment points may be required. Moreover, the required spacing between the attachment points of the puck may vary depending on the particular fixture configuration, and thus a puck with the appropriate spacing between attachment points may be required. In this manner, a puck with multiple attachment points can serve as a single anchor point that supports multiple attachment points and/or fixture configurations. In some embodiments, for example, pucks with multiple attachment points can be used to provide flexible seating configurations. For example, a puck with multiple attachment points could be used as an anchor that is shared by two adjacent seats (e.g., a wider seat placed adjacently to a narrower seat). As another example, a puck with multiple attachment points could be used as an anchor for multiple cargo nets (e.g., using a single puck as an anchor for two, three, or four cargo nets).

The illustrated example depicts four pucks 302a-d with different sizes, different numbers of attachment points 304, and different spacing between the attachment points 304. For example, puck 302a includes a single attachment point 304, while pucks 302b-d each include two attachment points 304. Moreover, pucks 302b-d each have different spacing between their respective attachment points 304. For example, puck 302b includes attachment points 304 that are spaced apart by 1.330 inches; puck 302c includes attachment points 304 that are spaced apart by 1.775 inches; and puck 302d includes attachment points 304 that are spaced apart by 2.665 inches. Finally, each puck 302a-d is a different size. The particular size, number of attachment points, and spacing of pucks may depend on the particular fixture configuration. For example, the particular designs used for pucks 302a-d are tailored for the various seating configurations described throughout this disclosure, such as 16-20 passenger seating configurations, and custom corporate and VIP seating configurations. Pucks used in other fixture configurations, however, may be any size and may include any number of attachments points and/or spacing between attachment points, as appropriate.

FIG. 3C illustrates example configurations of pucks 302 in the floor 308 of a rotorcraft. In the illustrated example, pilot and co-pilot seats 310 are attached to rotorcraft floor 308. Moreover, rotorcraft floor 308 includes an arrangement of pucks 302 that have different shapes, sizes, numbers of attachment points, and spacing between attachment points. Accordingly, the remaining seats, furniture, and/or other fixtures of the rotorcraft are configurable using the pucks 302 installed in the rotorcraft floor 308. The particular configuration and design of pucks 302 used in the illustrated example are tailored for the various rotorcraft seating configurations described throughout this disclosure, such as 16-20 passenger seating configurations, and custom corporate and VIP seating configurations. For example, a particular seating configuration described by this disclosure may be installed using some subset of the pucks 302 in the illustrated example. Moreover, as described throughout this disclosure, any unused pucks 302 may be plugged with puck covers.

Accordingly, in the illustrated example, a single rotorcraft floor panel 308 is installed with a configuration of pucks 302 that can be used for multiple seating configurations. In other cases, however, the rotorcraft floor panel 308 may only be installed with the particular pucks 302 that are required for a desired seating configuration. Moreover, in some embodiments, the floor panels 308 of rotorcraft may be removable, and thus depending on the desired seating configuration, a floor panel 308 with the appropriate puck configuration may be installed in the rotorcraft. Thus, in some cases, a rotorcraft may use a single floor panel 308 that supports multiple seating arrangements, while in other cases, a rotorcraft may use removable floor panels that each support a particular seating arrangement. In some cases, the particular approach may depend on the needs and/or requirements of an operator of the rotorcraft. For example, using a single floor panel with all pucks needed to support multiple seating arrangements may add additional weight to a rotorcraft (e.g., the weight from any unused pucks), while using multiple floor panels that each support a particular seating arrangement may be more lightweight but also more expensive.

Moreover, in some embodiments, various approaches can be used to identify which pucks 302 in a particular floor panel 308 or surface should be used for various seating or other fixture configurations. For example, in some cases, the pucks 302 may be color coded using different colors to identify the pucks 302 used for different configurations. The color coding, for example, may be provided either directly on the floor panel in which the pucks 302 are embedded and/or in associated documentation.

Figure 4:
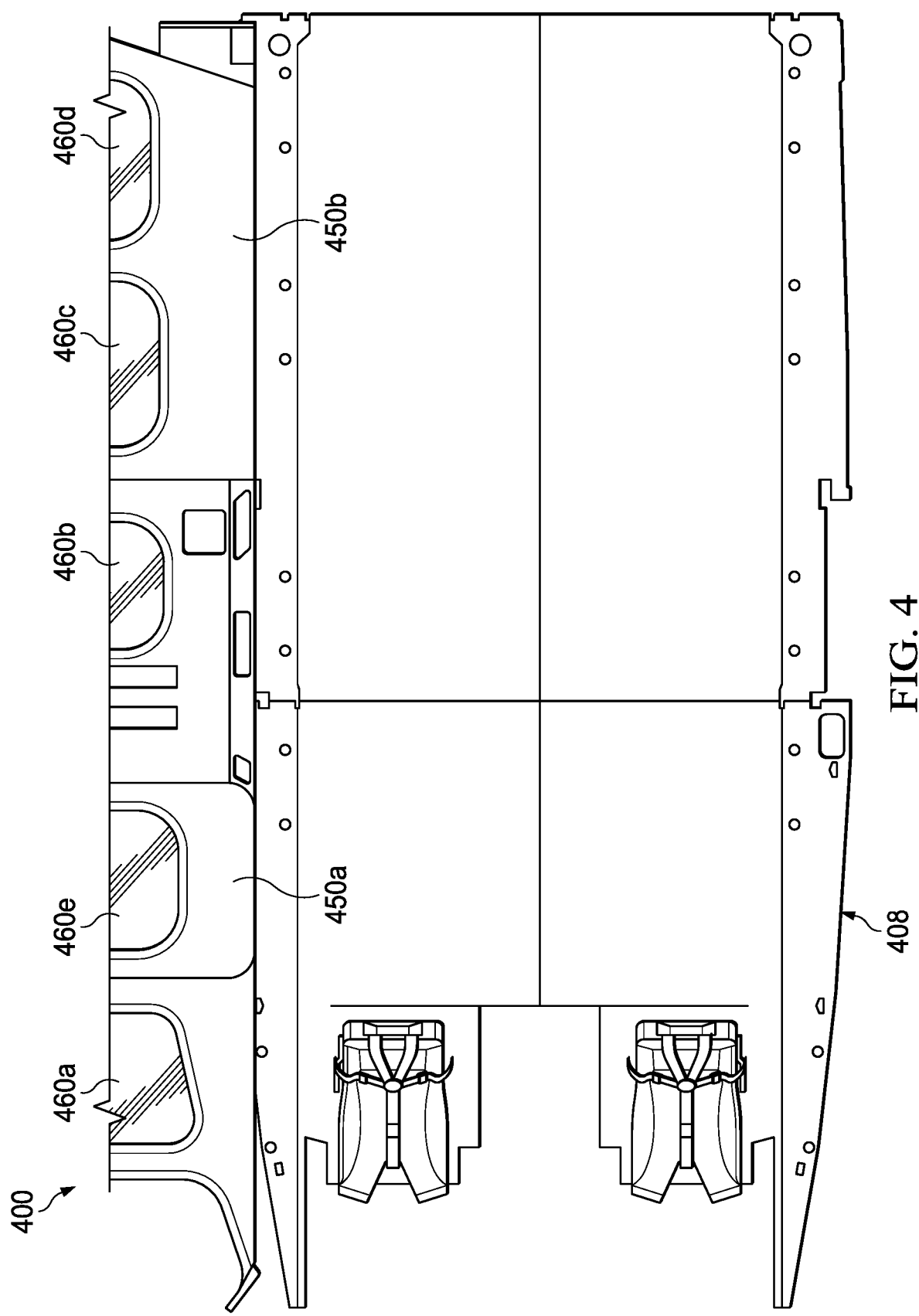
FIG. 4 illustrates example exit locations in a rotorcraft.

FIG. 4 illustrates example exit locations in a rotorcraft 400. In the illustrated example, rotorcraft 400 includes hinge door 450a, sliding door 450b, and pushout windows 460a-e, which may all be used as exits of rotorcraft 400. Hinge door 450a is a door attached to the rotorcraft 400 with a hinge used for opening and closing the door. In the illustrated example, hinge door 450a is located near the front of the rotorcraft cabin. Sliding door 450b is a door that can be opened and closed by sliding the door laterally. In the illustrated example, sliding door 450b is located near the rear of the rotorcraft cabin. Pushout windows 460a-e are windows that can be "pushed out" in order to be used as an exit, for example, in emergency situations. In the illustrated example, pushout window 460a is located near the cockpit (e.g., for access by the pilot and/or co-pilot), pushout window 460b is located near the middle of the rotorcraft cabin, pushout windows 460c and 460d are located in sliding door 450b near the rear of the rotorcraft cabin, and pushout window 460e is located in hinge door 450a near the front of the rotorcraft cabin.

Certain types and/or uses of rotorcraft or other aircraft may be subject to legal constraints (e.g., government safety regulations) relating to emergency exit access, which may impact the required seating configuration of an aircraft. For example, transport rotorcraft (e.g., helicopters) may be subject to FAA regulations associated with access to emergency exits, number of seats, seat and aisle spacing, and so forth (e.g., as set forth by various regulations from 14 C.F.R. § 29). For example, in some cases, FAA regulations may require a transport rotorcraft to have means for rapid evacuation in emergencies, access to each passenger exit for each passenger, access from each aisle to certain types of exits, and a particular width for the main passenger aisle (e.g., for 11 to 19 passengers, aisles may need to be 12 inches or 20 inches wide, depending on the seat heights). As another example, rotorcraft used for oil and gas exploration may be subject to standards (e.g., safety standards) from the International Association of Oil and Gas Producers (the IOGP or OGP). For example, OGP operator standards for enhanced safety specify that every seat in a rotorcraft should have access to an emergency exit with no more than one intervening seat.

Accordingly, rotorcraft operators may require a variety of seating configurations that satisfy their respective business requirements along with any applicable legal constraints, such as government or industry safety regulations. Thus, in some cases, a rotorcraft 400 may use pucks (e.g., pucks 302 of FIGS. 3A-C) to enable flexible seating configurations that satisfy the business requirements of the operator while also complying with any applicable regulations or standards, such as FAA and OGP standards. This disclosure describes and illustrates various FAA and OGP compliant seating configurations installed using pucks, such as certain seating configurations described below in connection with FIG. 5.

FIGS. 5A-K illustrate example rotorcraft seating configurations that may comply with various regulations and standards, such as certain FAA and OGP standards. For example, as described above in connection with FIG. 4, OGP operator standards for enhanced safety specify that every seat in a rotorcraft should have access to an emergency exit with no more than one intervening seat. The example seating configurations of FIG. 5 are for 16-19 passengers (PAX), and certain seating configurations are compliant with OGP standards. Moreover, the example seating configurations of FIG. 5 may be installed using pucks, such as pucks 302 of FIGS. 3A-C.

Figure 5A:
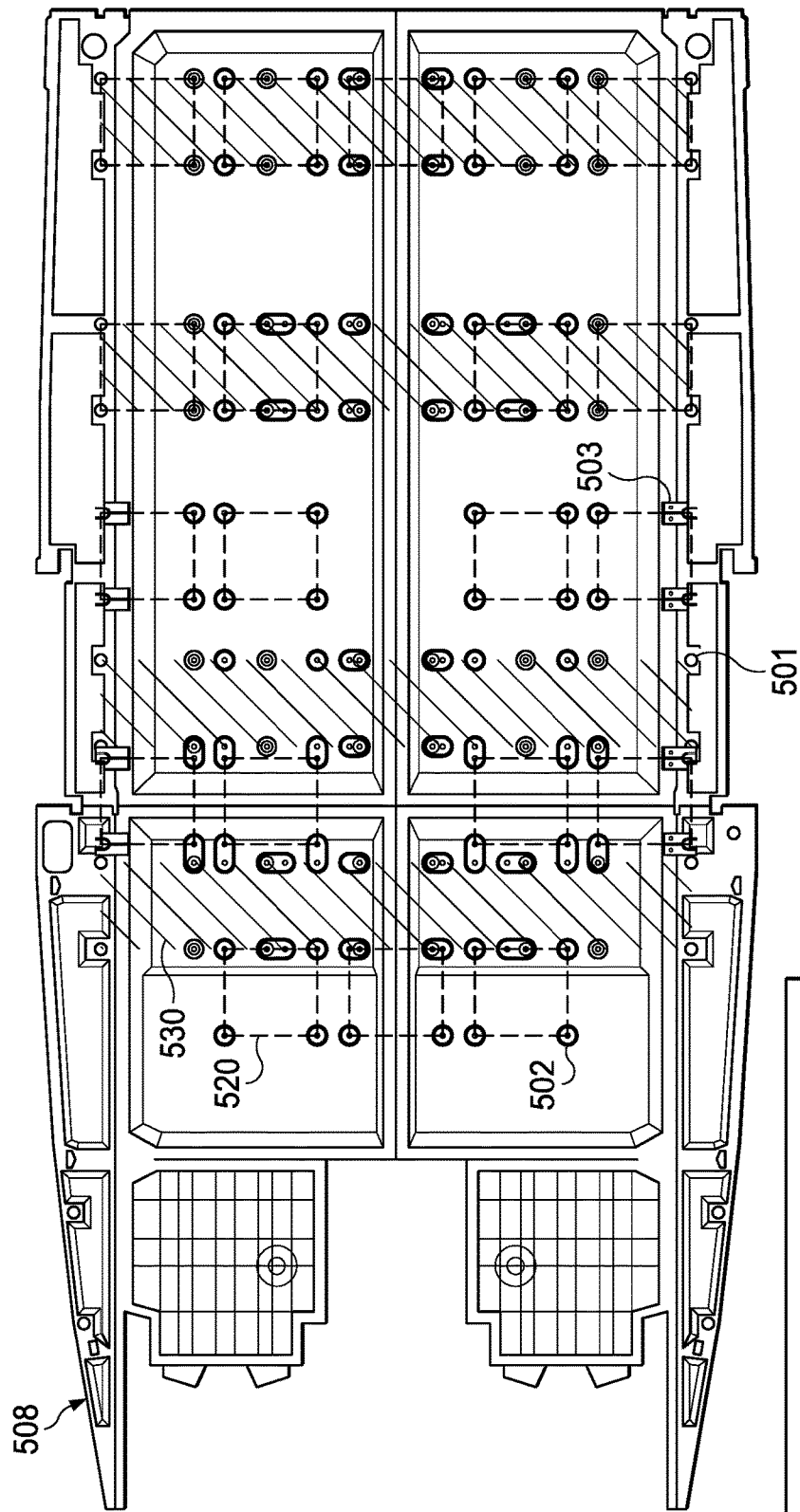
FIGS. 5A-K illustrate example rotorcraft seating configurations that comply with certain regulations and/or standards.

FIG. 5A illustrates example OGP compliant configurations for 16-19 passengers (PAX). In the illustrated example, the floor 508 of a rotorcraft is shown. Rotorcraft floor 508 includes existing seat provisions 501, seat pucks 502, and additional seat provisions 503. Existing seat provisions 501, for example, may be seat attachment mechanisms that already exist in rotorcraft floor 508, such as seat attachment mechanisms that are installed during the manufacturing or fabrication stage of rotorcraft floor 508. Seat pucks 502 may be puck-based seat attachment mechanisms (e.g., pucks 302 of FIGS. 3A-C) used to enable flexible seating arrangements. In some cases, seat pucks 502 may be installed after the manufacturing or fabrication stage of rotorcraft floor 508. Moreover, the arrangement of seat pucks 502 installed in rotorcraft floor 508 may be varied based on the desired seating configuration of the rotorcraft operator. Moreover, additional seat provisions 503 (e.g., seat attachment mechanisms other than existing seat provisions 501 and seat pucks 502) may also be installed in rotorcraft floor 508 for certain seating configurations.

The seating provisions 501-503 in rotorcraft floor 508 of FIG. 5A may be used to install various seating configurations, such as the 16-19 passenger seating configurations shown throughout the remaining illustrations of FIG. 5. For example, FIG. 5A identifies where the seating fixtures would be installed, and which seat attachment provisions 501-503 would be used, for the various seating configurations illustrated throughout FIG. 5. For example, the location of each seating fixture is indicated in FIG. 5A by the overlay of seat fixture locations 520 and 530 on rotorcraft floor 508. Moreover, the particular seat attachment provisions 501-503 used to attach each seating fixture is indicated in FIG. 5A by the overlay of each seat fixture location 520 and 530 on the corresponding seat attachment provisions 501-503. FIG. 5A also indicates the type and orientation of each seat puck 502 in rotorcraft floor 508. For example, the type of each puck 502 is indicated in FIG. 5A by the varying sizes and number of holes of the pucks 502 in rotorcraft floor 508 (e.g., similar to the various puck types illustrated in FIGS. 3A-C). Similarly, the orientation of each puck 502 in rotorcraft floor 508 is also depicted in FIG. 5A.

For example, for a 16 passenger configuration, FIG. 5A identifies where the associated seat rows 530 would be installed, and which seat attachment provisions 501-503 would be used for each seat row 530. The 16 passenger configuration, for example, may be installed by attaching four seat rows 530 (e.g., with four seats per row) to the appropriate seat provisions 501-503 throughout the cabin floor 508 of the rotorcraft. Similarly, for 17-19 passenger configurations, FIG. 5A identifies where the various seats 520 would be installed, and which seat attachment provisions 501-503 would be used for each seat 520. For example, the 17-19 passenger configurations may be installed by attaching the desired number of seats 520 to the appropriate seat provisions 501-503 throughout the cabin floor 508 of the rotorcraft.

Moreover, the 16-19 passenger seating configurations illustrated throughout FIG. 5 may be compliant with various applicable regulations and standards, such as the FAA and OGP regulations and standards discussed above in connection with FIG. 4. For example, in certain seating configurations illustrated throughout FIG. 5, every seat in the rotorcraft has access to an emergency exit with no more than one intervening seat between the exit, as specified by OGP operator enhanced safety standards. Moreover, certain seating configurations illustrated throughout FIG. 5 are also compliant with FAA regulations regarding access to emergency exits, number of seats, and seat and aisle spacing, among other examples.

Examples of various seating arrangements that can be installed using the illustrated configuration of in FIG. 5A (or another similar configuration) are described below in connection with the remaining illustrations of FIG. 5.

Figure 5B:
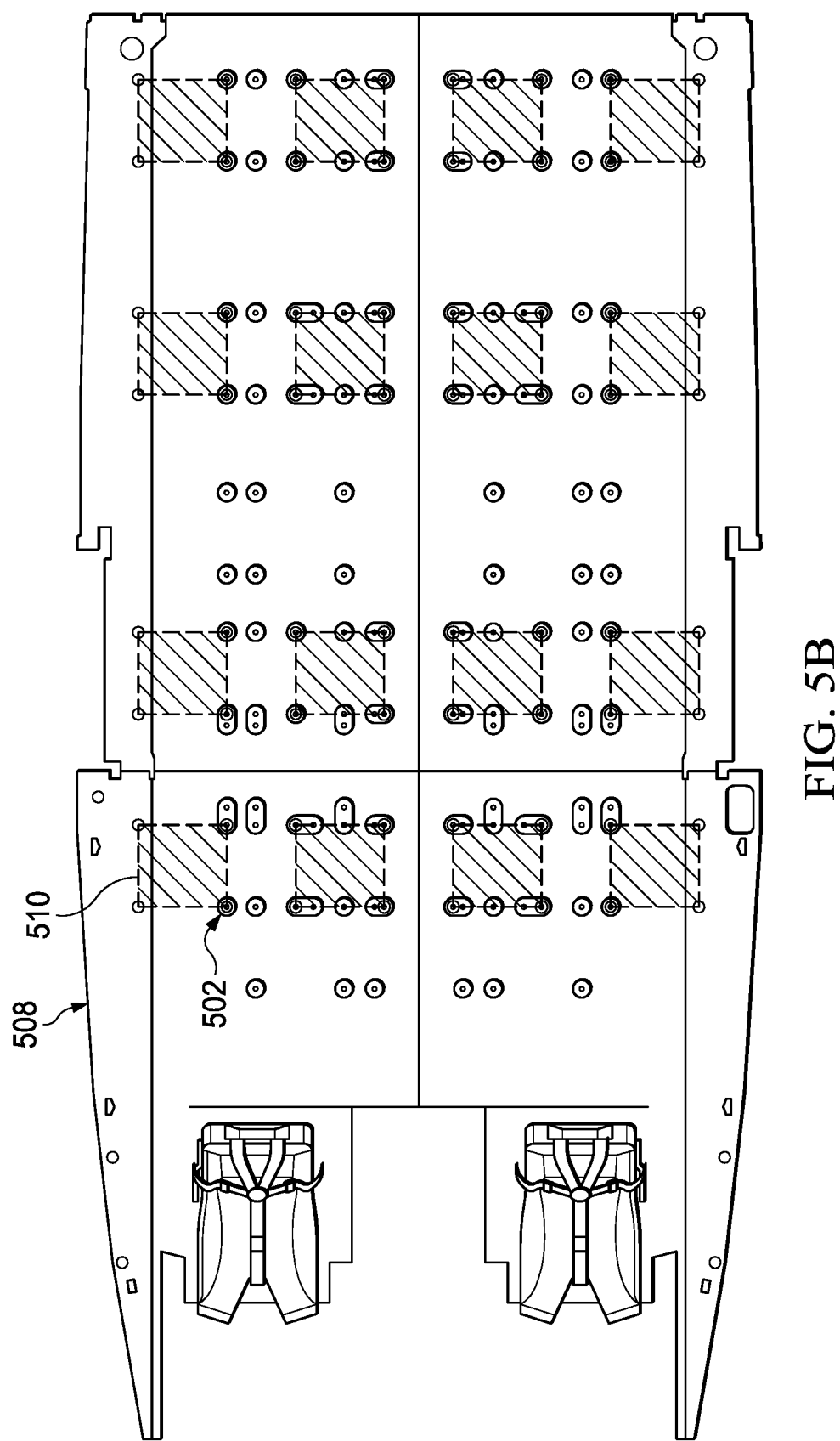

FIG. 5B illustrates the locations of pucks 502 installed in a rotorcraft floor 508 for a 16 passenger seating arrangement. The illustrated example identifies where the various pucks 502 are installed, where the seats 510 would be installed, and which pucks 502 (or other seat attachment provisions) would be used for each seat location 510. For example, the location of each seat 510 is indicated in the illustrated example by the overlay of seat locations 510 on the rotorcraft floor 508. Moreover, the particular pucks 502 used to attach each seat 510 is indicated in the illustrated example by the overlay of each seat location 510 on the corresponding pucks 502.

Moreover, the illustrated example indicates the type and orientation of each puck 502. For example, the type of each puck 502 is indicated in the illustrated example by the varying sizes and number of holes of the pucks 502 in rotorcraft floor 508 (e.g., similar to the various puck types illustrated in FIGS. 3A-C). Similarly, the orientation of each puck 502 in rotorcraft floor 508 is also depicted in the illustrated example.

In the illustrated example, a 16 passenger seating configuration could be installed by attaching four rows of seats 510 (with four seats 510 per row) to the rotorcraft floor 508 using pucks 502 (and/or using other seat attachment mechanisms). For example, the various seats 510 of the 16 passenger seating configuration could be attached throughout the cabin floor 508 using the appropriate pucks 502 (and/or other seat attachment mechanisms) depicted by the illustrated example.

Figure 5C:
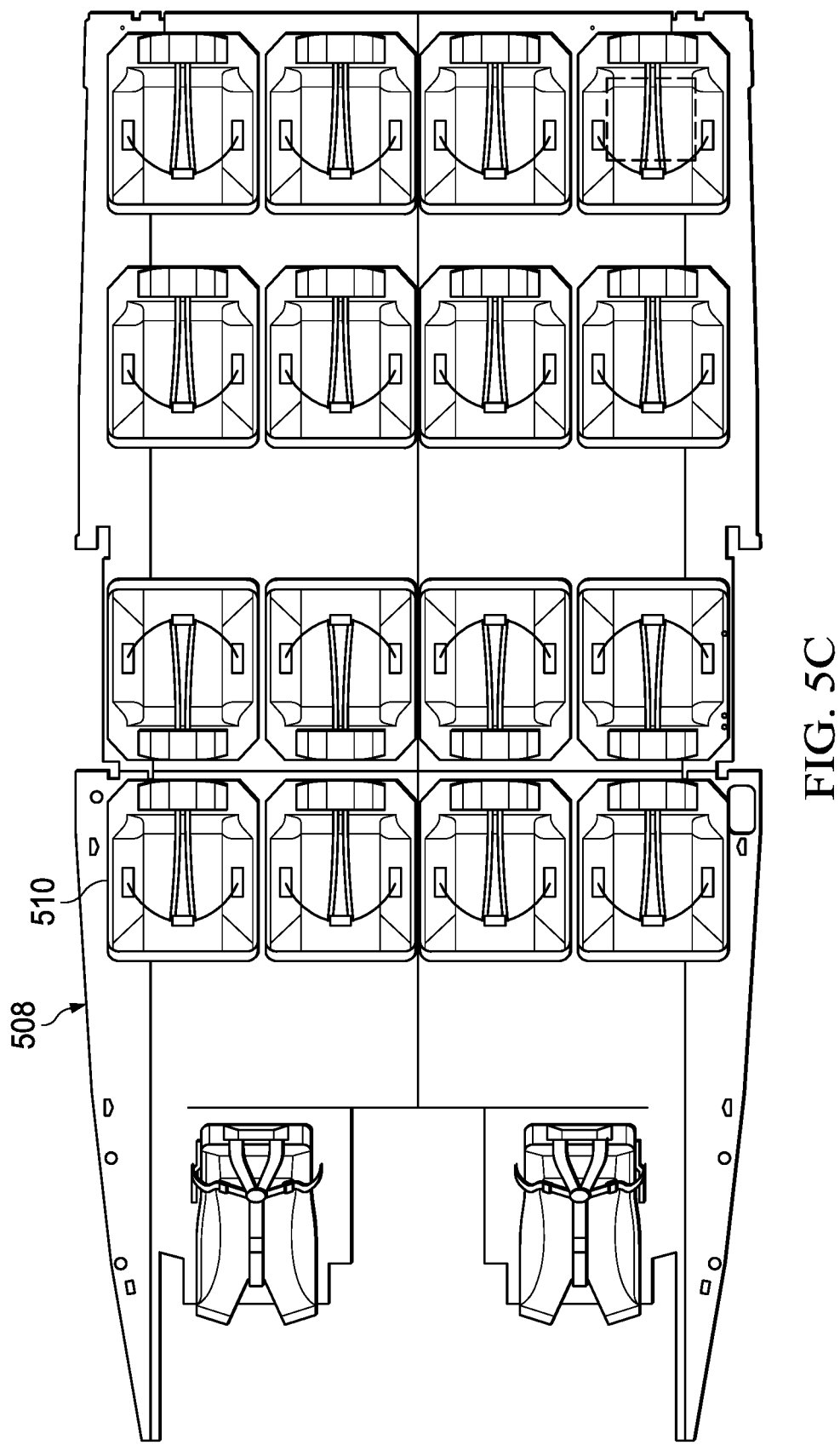

FIG. 5C illustrates an example seating arrangement for 16 passengers. The illustrated seating arrangement, for example, includes an arrangement of 16 seats 510 installed in rotorcraft floor 508 using the puck configuration of FIG. 5B. As shown in the illustrated example, there are four rows of seats 510 throughout the cabin floor 508 of the rotorcraft, and each row includes four adjacent seats 510. The seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other.

Figure 5D:
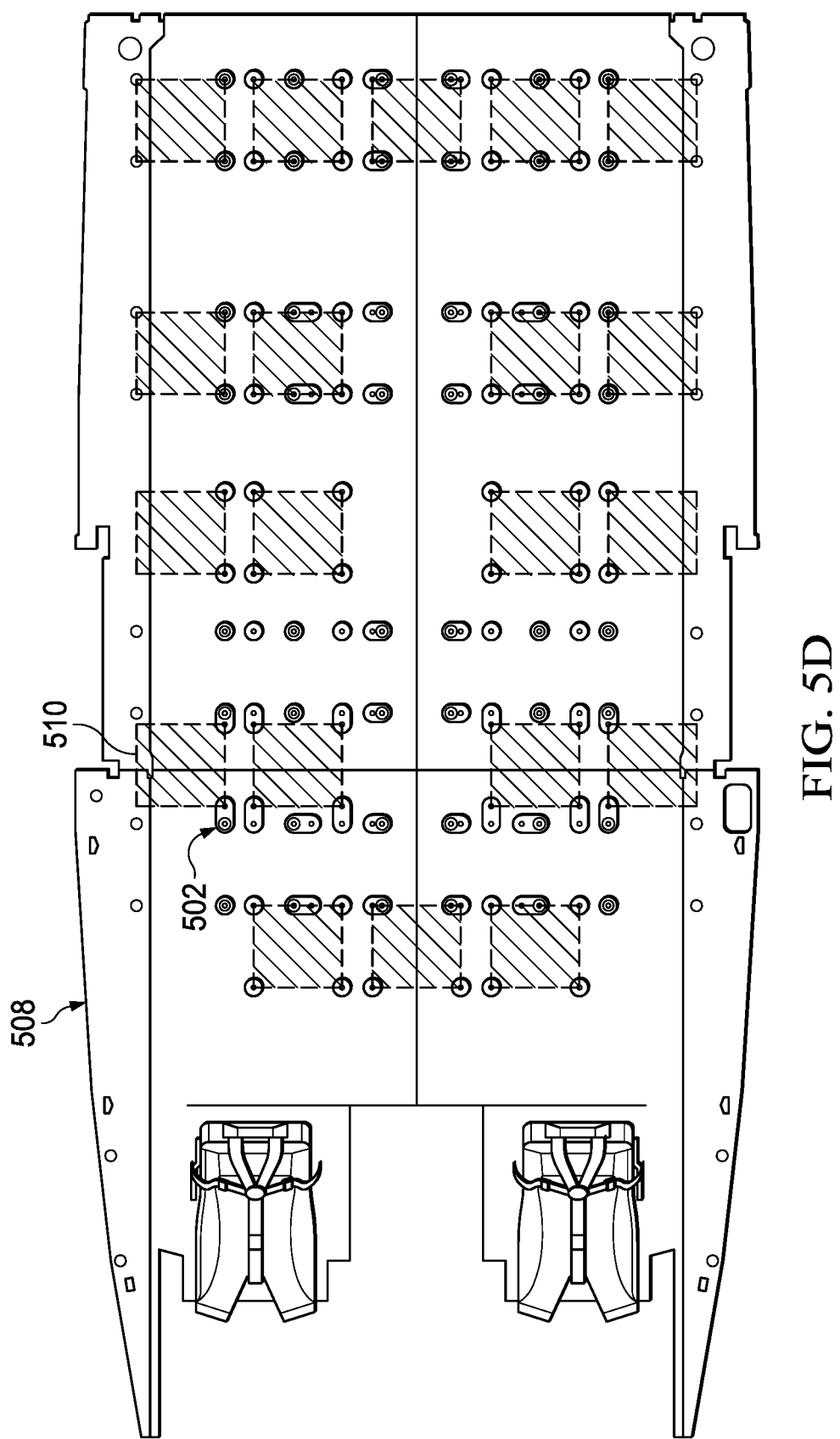

FIG. 5D illustrates the locations of pucks 502 installed in a rotorcraft floor 508 for 17-19 passenger seating arrangements. The illustrated example identifies where the various pucks 502 are installed, where the seats 510 could be installed, and which pucks 502 (or other seat attachment provisions) would be used for each seat location 510. For example, the location of each seat 510 is indicated in the illustrated example by the overlay of seat locations 510 on the rotorcraft floor 508. Moreover, the particular pucks 502 used to attach each seat 510 is indicated in the illustrated example by the overlay of each seat location 510 on the corresponding pucks 502.

Moreover, the illustrated example indicates the type and orientation of each puck 502. For example, the type of each puck 502 is indicated in the illustrated example by the varying sizes and number of holes of the pucks 502 in rotorcraft floor 508 (e.g., similar to the various puck types illustrated in FIGS. 3A-C). Similarly, the orientation of each puck 502 in rotorcraft floor 508 is also depicted in the illustrated example.

In the illustrated example, 17-19 passenger seating configurations could be installed by attaching the appropriate number of seats to rotorcraft floor 508 at the illustrated seat installation locations 510. Moreover, the seats can be attached using the corresponding pucks 502 (and/or other seat attachment mechanisms) depicted for each illustrated seat location 510. For example, there are 20 possible seat locations 510 shown in the illustrated example. However, because 20 passenger configurations may be subject to additional regulations and/or standards, in some cases only a subset of the 20 total seat locations 510 may be used. For example, seating configurations for 17-19 passengers could be installed using an appropriate subset of the 20 total seat locations 510. Moreover, in order to maintain compliance with applicable regulations and standards (e.g., FAA and/or OGP standards), the subset of seat locations 510 may be chosen such that the unused seat location(s) 510 are in the $1^{st}$ row and/or the center of the $5^{th}$ row (e.g., the last row), in order to maintain the center aisle of rotorcraft floor 508. For example, a 19 passenger configuration could use all the illustrated seat locations 510 with the exception of one unused seat location 510 in either the $1^{st}$ row or the center of the $5^{th}$ row. In other embodiments, however, the unused seat location(s) 510 can be any of the seat locations 510 of any row.

Figure 5E:
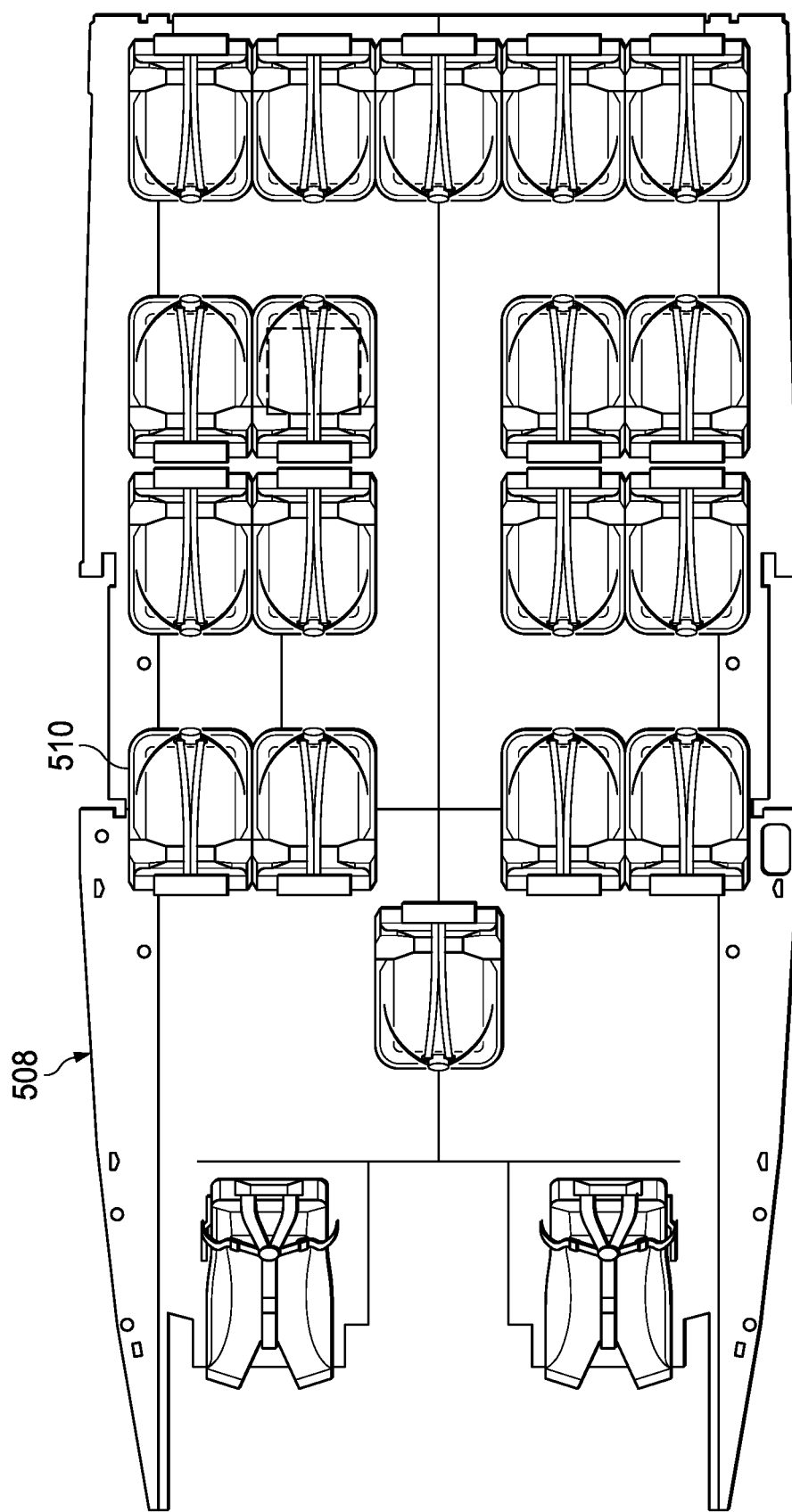

FIG. 5E illustrates an example seating arrangement for 18 passengers. The illustrated seating arrangement, for example, includes an arrangement of 18 seats 510 installed in rotorcraft floor 508 using the puck configuration of FIG. 5D. For example, the illustrated seating arrangement in FIG. 5E uses the seat locations 510 from FIG. 5D, with the exception of two unused seat locations on the left and right ends of the $1^{st}$ row. As shown in the illustrated example, there are five rows of seats 510 throughout the cabin floor 508 of the rotorcraft. The $1^{st}$ row includes one seat; the $2^{nd}$, $3^{rd}$, and $4^{th}$ rows each include four seats; and the $5^{th}$ row includes five seats. The seats in the $1^{st}$, $3^{rd}$, and $5^{th}$ rows all face towards the front of the rotorcraft, while the seats in the $2^{nd}$ and $4^{th}$ rows face towards the back of the rotorcraft. In this manner, the seats in the $2^{nd}$ and $3^{rd}$ rows face each other, and the seats in the $4^{th}$ and $5^{th}$ rows also face each other. Moreover, the seats 510 are arranged such that an aisle is formed through the $2^{nd}$, $3^{rd}$, and $4^{th}$ rows.

Figure 5F:
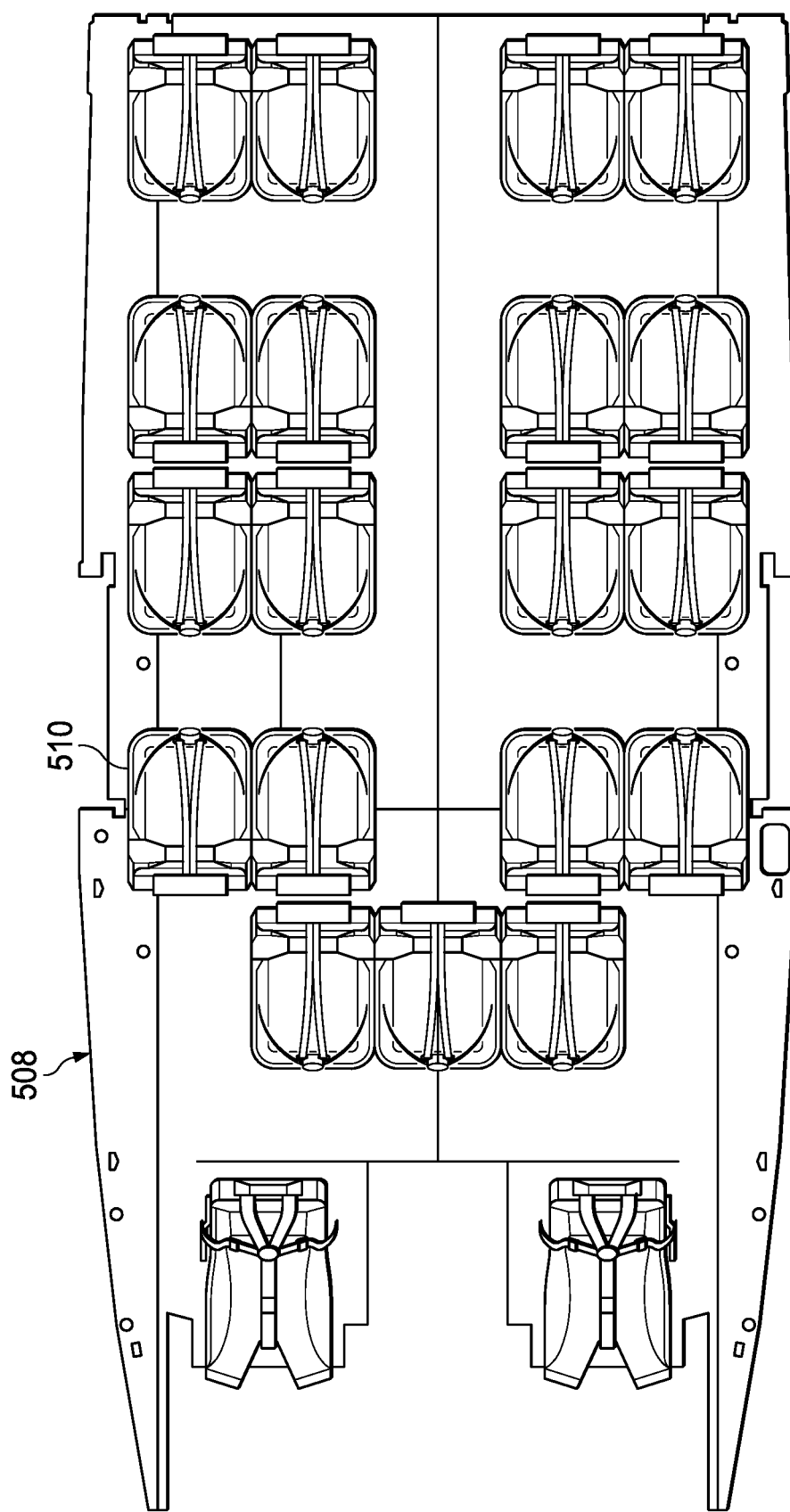

FIG. 5F illustrates an example seating arrangement for 19 passengers. The illustrated seating arrangement, for example, includes an arrangement of 19 seats 510 installed in rotorcraft floor 508 using the puck configuration of FIG. 5D. For example, the illustrated seating arrangement in FIG. 5F uses the seat locations 510 from FIG. 5D, with the exception of one unused seat location at the center of the $5^{th}$ row (e.g., the last row). As shown in the illustrated example, there are five rows of seats 510 throughout the cabin floor 508 of the rotorcraft. The $1^{st}$ row includes three seats, and the $2^{nd}$-$5^{th}$ rows each include four seats. Moreover, the seats in the $1^{st}$, $3^{rd}$, and $5^{th}$ rows all face towards the front of the rotorcraft, while the seats in the $2^{nd}$ and $4^{th}$ rows face towards the back of the rotorcraft. In this manner, the seats in the $2^{nd}$ and $3^{rd}$ rows face each other, and the seats in the $4^{th}$ and $5^{th}$ rows also face each other. Moreover, the seats 510 are arranged such that an aisle is formed through the $2^{nd}$, $3^{rd}$, $4^{th}$, and $5^{th}$ rows.

Figure 5G:
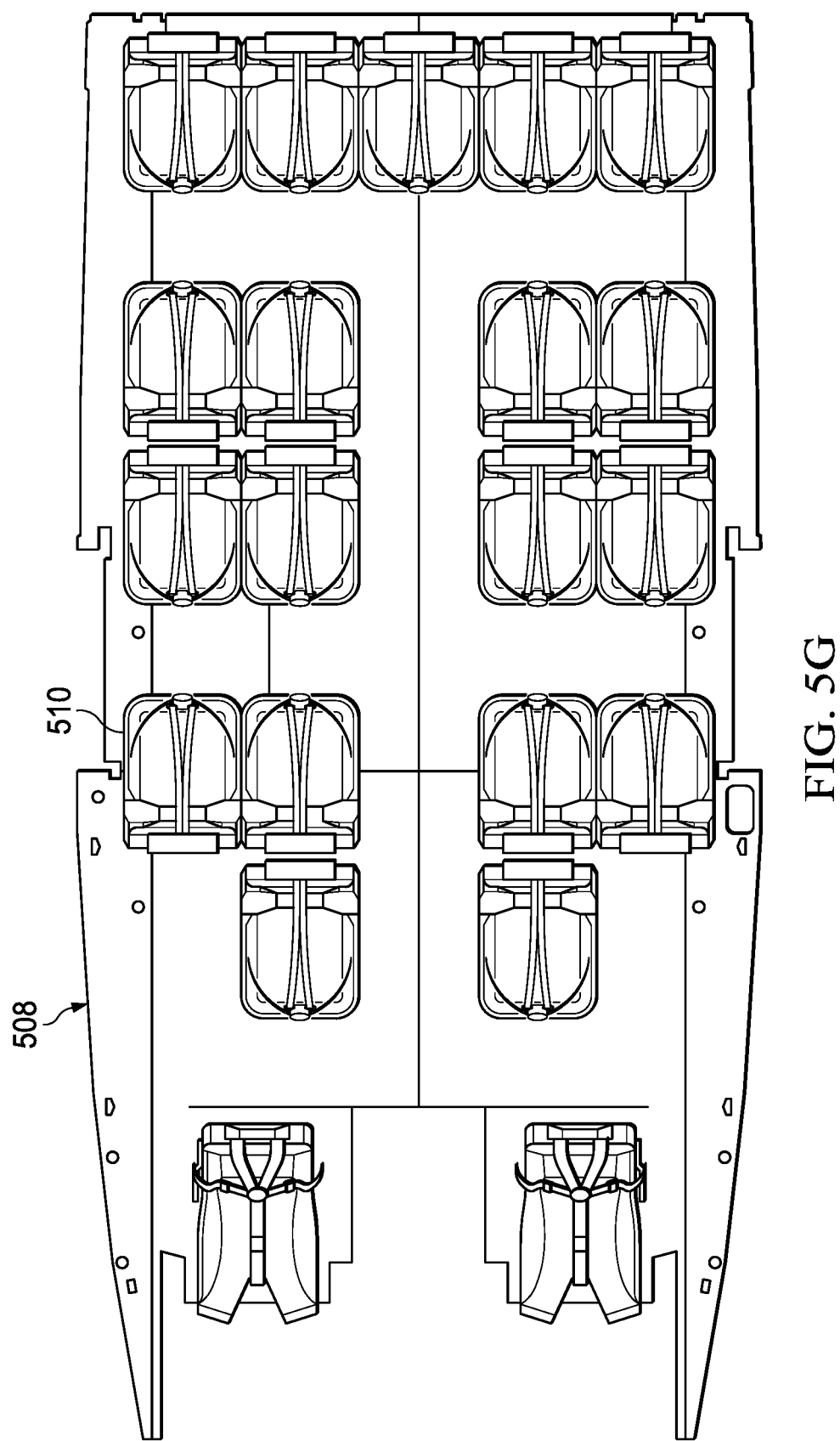

FIG. 5G illustrates another example seating arrangement for 19 passengers. The illustrated seating arrangement of FIG. 5G, for example, is similar to the seating arrangement of FIG. 5F, except the unused seat location in FIG. 5G is at the center of the $1^{st}$ row rather than the center of the $5^{th}$ row (as in FIG. 5F). The illustrated seating arrangement of FIG. 5G, for example, includes an arrangement of 19 seats 510 installed in rotorcraft floor 508 using the puck configuration of FIG. 5D. For example, the illustrated seating arrangement in FIG. 5G uses the seat locations 510 from FIG. 5D, with the exception of one unused seat location at the center of the $1^{st}$ row. As shown in the illustrated example, there are five rows of seats 510 throughout the cabin floor 508 of the rotorcraft. The $1^{st}$ row includes two seats; the $2^{nd}$-$4^{th}$ rows each include four seats; and the $5^{th}$ row includes five seats. Moreover, the seats in the $1^{st}$, $3^{rd}$, and $5^{th}$ rows all face towards the front of the rotorcraft, while the seats in the $2^{nd}$ and $4^{th}$ rows face towards the back of the rotorcraft. In this manner, the seats in the $2^{nd}$ and $3^{rd}$ rows face each other, and the seats in the $4^{th}$ and $5^{th}$ rows also face each other. Moreover, the seats 510 are arranged such that an aisle is formed through the $1^{st}$, $2^{nd}$, $3^{rd}$, and $4^{th}$ rows.

Figure 5H:
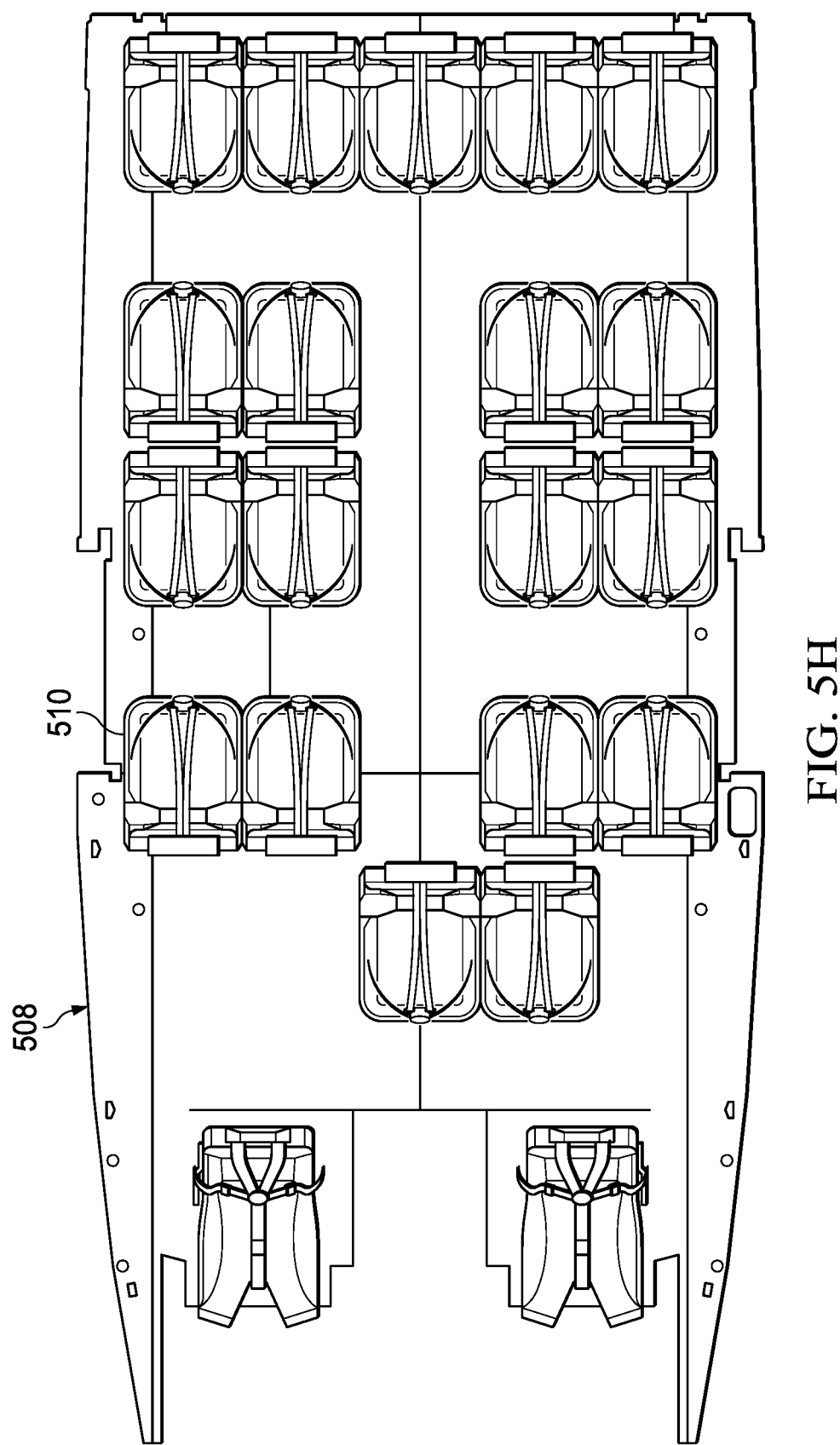

FIG. 5H illustrates another example seating arrangement for 19 passengers. The illustrated seating arrangement of FIG. 5H, for example, is similar to the seating arrangement of FIG. 5G, except the unused seat location in FIG. 5H is at the right end of the $1^{st}$ row rather than the center of the $1^{st}$ row (as in FIG. 5G). The illustrated seating arrangement of FIG. 5H, for example, includes an arrangement of 19 seats 510 installed in rotorcraft floor 508 using the puck configuration of FIG. 5D. For example, the illustrated seating arrangement in FIG. 5H uses the seat locations 510 from FIG. 5D, with the exception of one unused seat location at the right end of the $1^{st}$ row. As shown in the illustrated example, there are five rows of seats 510 throughout the cabin floor 508 of the rotorcraft. The $1^{st}$ row includes two seats; the $2^{nd}$-$4^{th}$ rows each include four seats; and the $5^{th}$ row includes five seats. Moreover, the seats in the $1^{st}$, $3^{rd}$, and $5^{th}$ rows all face towards the front of the rotorcraft, while the seats in the $2^{nd}$ and $4^{th}$ rows face towards the back of the rotorcraft. In this manner, the seats in the $2^{nd}$ and $3^{rd}$ rows face each other, and the seats in the $4^{th}$ and $5^{th}$ rows also face each other. Moreover, the seats 510 are arranged such that an aisle is formed through the $2^{nd}$, $3^{rd}$, and $4^{th}$ rows.

Figure 5I:
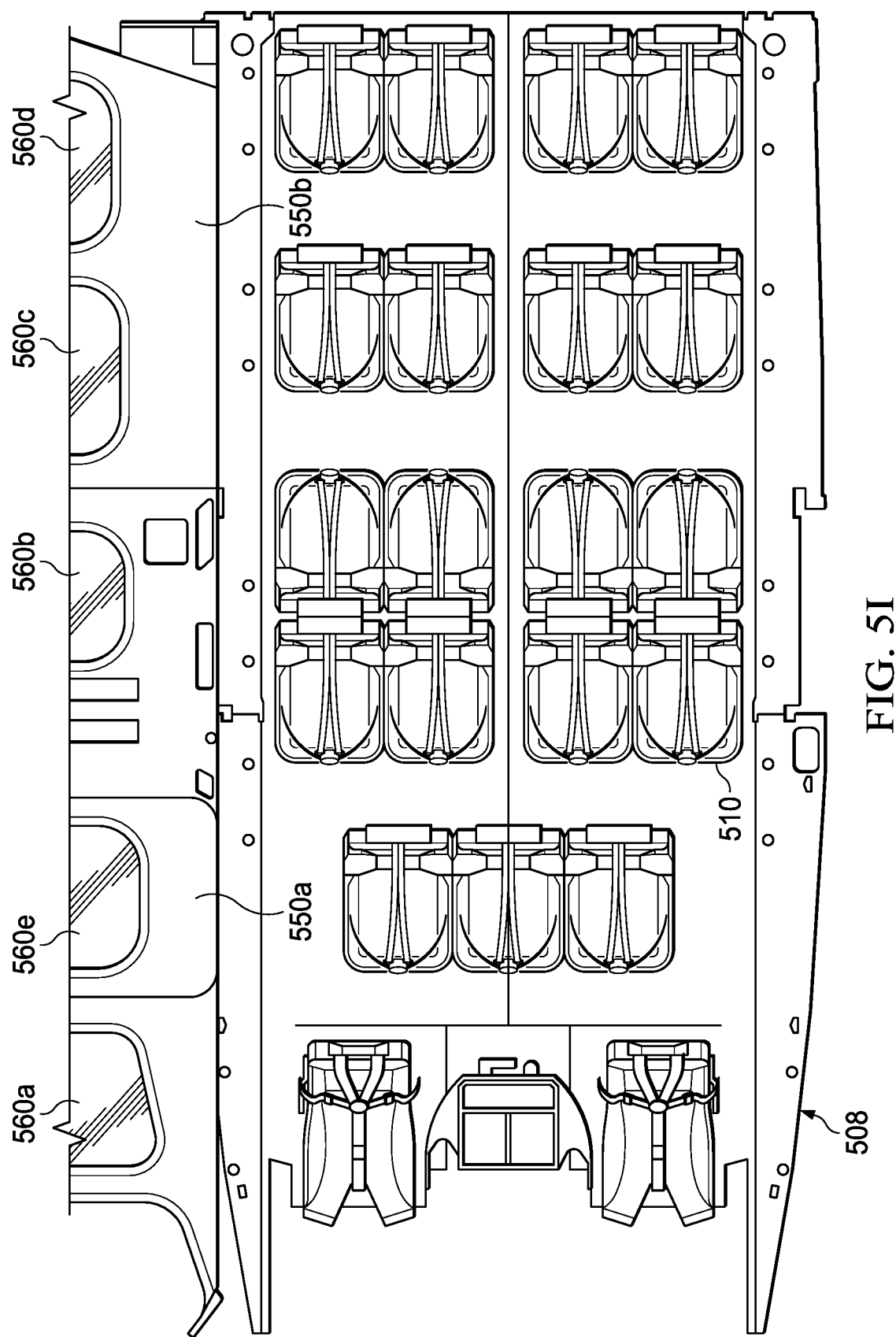

FIG. 5I illustrates another example seating arrangement for 19 passengers. In the illustrated seating arrangement, the seats 510 are arranged such that each seat faces the nearest exit(s) of the rotorcraft (e.g., the exits identified in connection with FIG. 4). The illustrated seating arrangement, for example, includes an arrangement of 19 seats 510. As shown in the illustrated example, there are five rows of seats 510 throughout the cabin floor 508 of the rotorcraft. The $1^{st}$ row includes three seats, and the $2^{nd}$-$5^{th}$ rows each include four seats. Moreover, the seats in the $1^{st}$, $2^{nd}$, $4^{th}$, and $5^{th}$ rows all face towards the front of the rotorcraft, while the seats in the $3^{rd}$ row face towards the back of the rotorcraft. In this manner, the seats in the $3^{rd}$ and $4^{th}$ rows face each other. Moreover, the $1^{st}$ and $2^{nd}$ rows face the exits through hinged door 550a and its associated pushout window 560e (near the front of the rotorcraft). The $3^{rd}$, $4^{th}$, and $5^{th}$ rows face the exits through pushout window 560b (near the middle of the rotorcraft), sliding door 550b (near the rear of the rotorcraft), and pushout windows 560c and 560d in sliding door 550b.

Figure 5J:
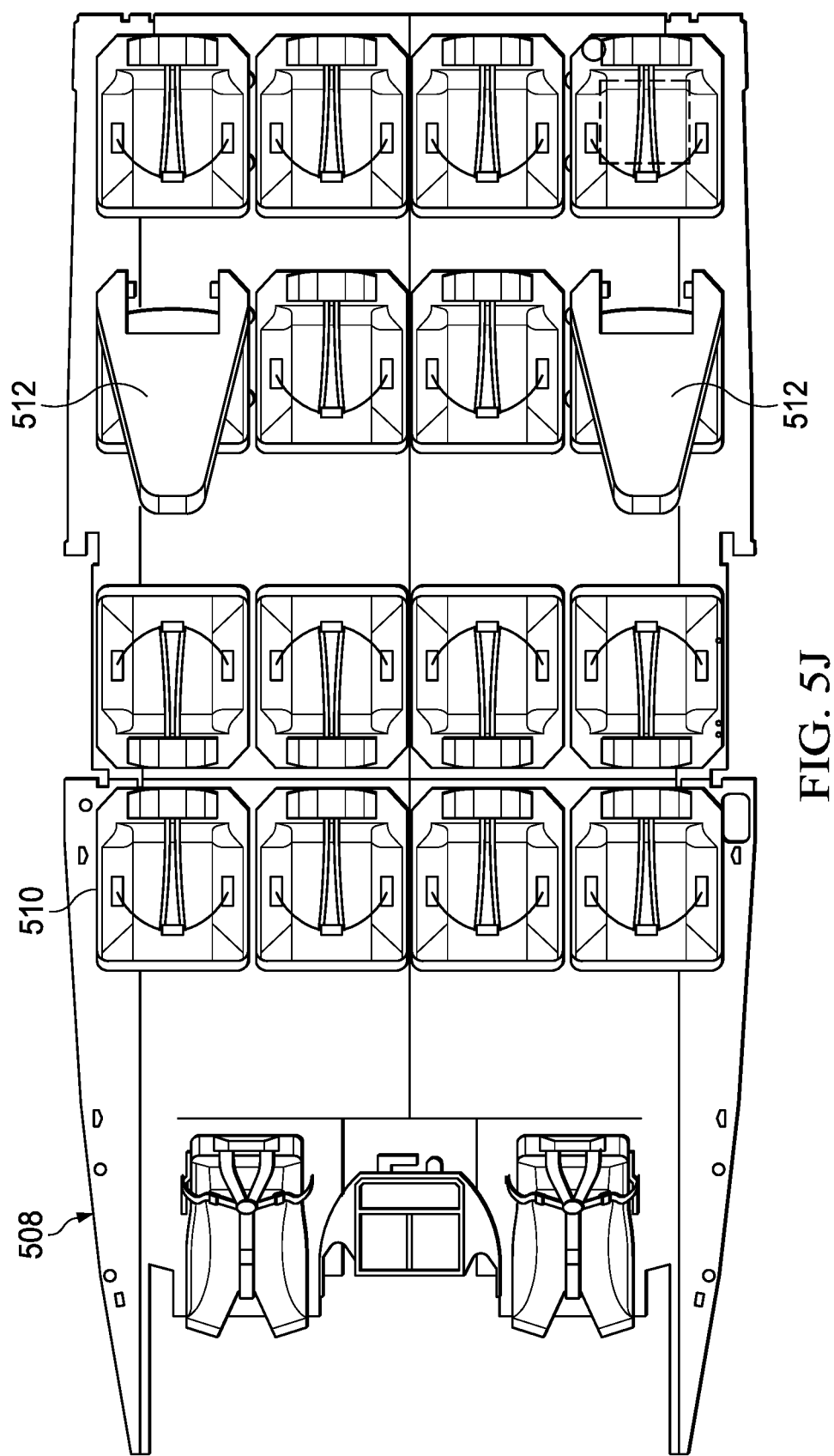
Figure 5K:
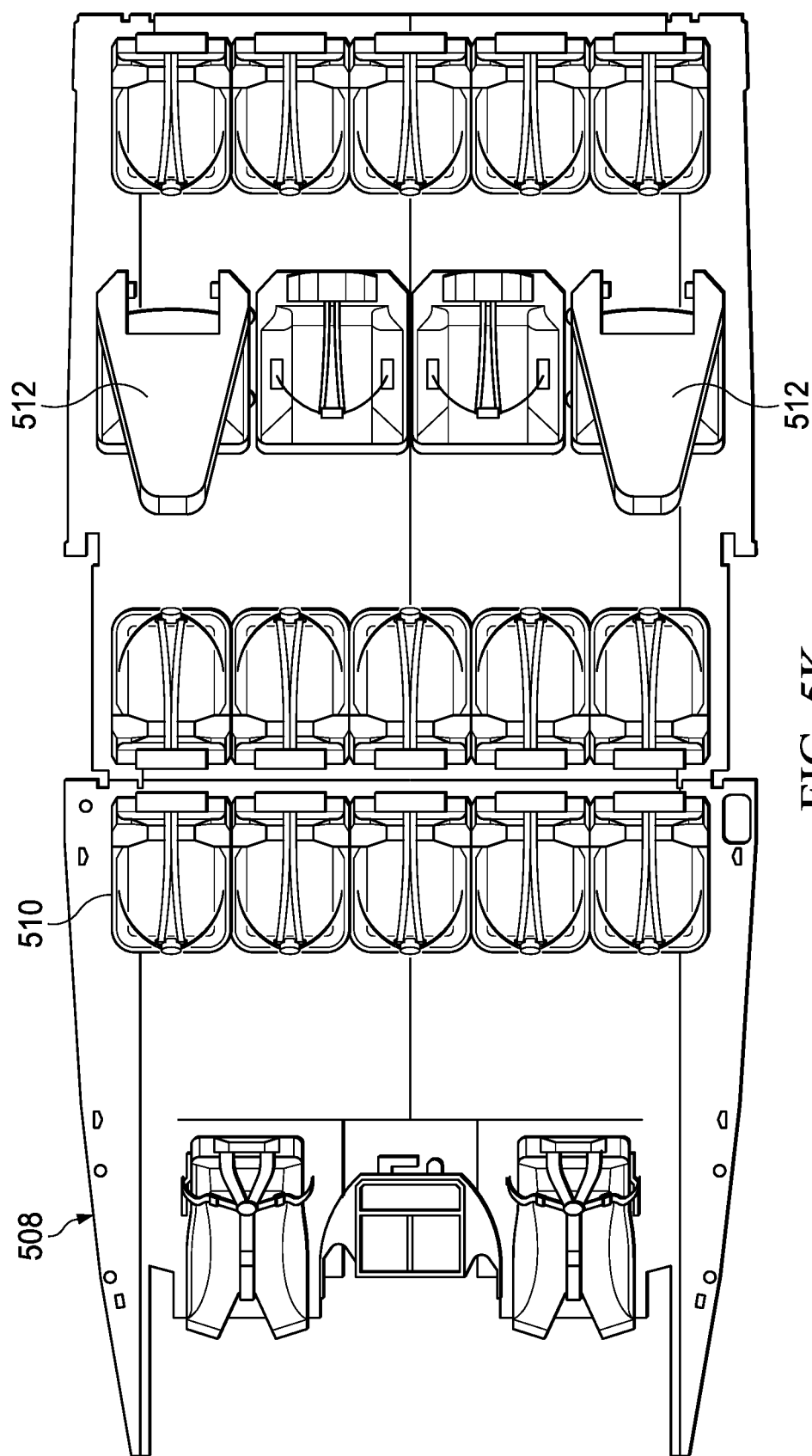

FIGS. 5J and 5K illustrate example rotorcraft seating arrangements with foldover seats. In some embodiments, for example, the illustrated seating arrangements may be installed using pucks, such as pucks 302 of FIGS. 3A-C.

Foldover seats may facilitate access to emergency exits for certain passengers in a rotorcraft, depending on the particular seating arrangement. Accordingly, foldover seats may be used to provide seating arrangements for varying numbers of passengers that also comply with any applicable regulations and standards, such as the FAA and OGP regulations and standards discussed above in connection with FIG. 4. For example, foldover seats can be strategically placed in a rotorcraft cabin to facilitate access to emergency exits for purposes of emergency egress of a rotorcraft.

The illustrated seating arrangements of FIGS. 5J-K are for 16 passengers and 19 passengers, respectively. Foldover seats may be used in other seating arrangements for any number of passengers, however, based on the particular needs and/or requirements of the rotorcraft or aircraft operator.

FIG. 5J illustrates a 16 passenger seating arrangement with foldover seats 512. The illustrated seating arrangement of FIG. 5J is similar to the 16 passenger seating arrangement of FIG. 5C, except the seating arrangement of FIG. 5J includes foldover seats 512 on the left and right ends of the $3^{rd}$ row. As shown in FIG. 5J, for example, there are four rows of seats 510 throughout the cabin floor 508 of the rotorcraft, and each row includes four adjacent seats 510. The seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other. Moreover, the two seats on the left and right ends of the $3^{rd}$ row are foldover seats 512, which may facilitate emergency exit access and egress for certain passengers.

For example, foldover seats 512 may enable passengers in the $2^{nd}$ row and/or $3^{rd}$ row to exit through a sliding door at the back right of the rotorcraft (e.g., sliding door 450b of FIG. 4). In some cases, for example, passengers in the $2^{nd}$ row and/or $3^{rd}$ row may normally be able to exit through a pushout window in the middle right side of the rotorcraft (e.g., pushout window 460b of FIG. 4), without using foldover seats 512. However, if the sliding door at the back right of the rotorcraft is ajar (e.g., sliding door 450b of FIG. 4), then it may block or obstruct the exit through the middle pushout window (e.g., pushout window 460b of FIG. 4). Accordingly, foldover seats 512 may enable passengers in the $2^{nd}$ row and/or $3^{rd}$ row to exit through the back right sliding door (e.g., sliding door 450b of FIG. 4) when the middle pushout window exit (e.g., pushout window 460b of FIG. 4) is blocked or obstructed. Similarly, foldover seats 512 may enable passengers in the $4^{th}$ row to exit through the middle pushout window (e.g., pushout window 460b of FIG. 4) as needed, such as when the back right sliding door cannot be used for a particular reason.

FIG. 5K illustrates a 19 passenger seating arrangement with foldover seats 512. As shown in FIG. 5K, for example, there are four rows of seats 510 throughout the cabin floor 508 of the rotorcraft. The $1^{st}$, $2^{nd}$, and $4^{th}$ rows each include five seats, and the $3^{rd}$ row includes four seats. Moreover, the seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other. Moreover, the two seats on the left and right ends of the $3^{rd}$ row are foldover seats 512, which may facilitate emergency exit access and egress for certain passengers (e.g., as described above for FIG. 5J). For example, foldover seats 512 may enable passengers in the $2^{nd}$ row and/or $3^{rd}$ row to exit through a sliding door at the back right of the rotorcraft (e.g., sliding door 450b of FIG. 4) rather than a pushout window in the middle right side of the rotorcraft (e.g., pushout window 460b of FIG. 4), such as when the sliding door is ajar and is blocking the middle pushout window exit. Similarly, foldover seats 512 may enable passengers in the $4^{th}$ row to exit through the middle pushout window (e.g., pushout window 460b of FIG. 4) as needed, such as when the back right sliding door cannot be used for a particular reason.

Figure 6A:
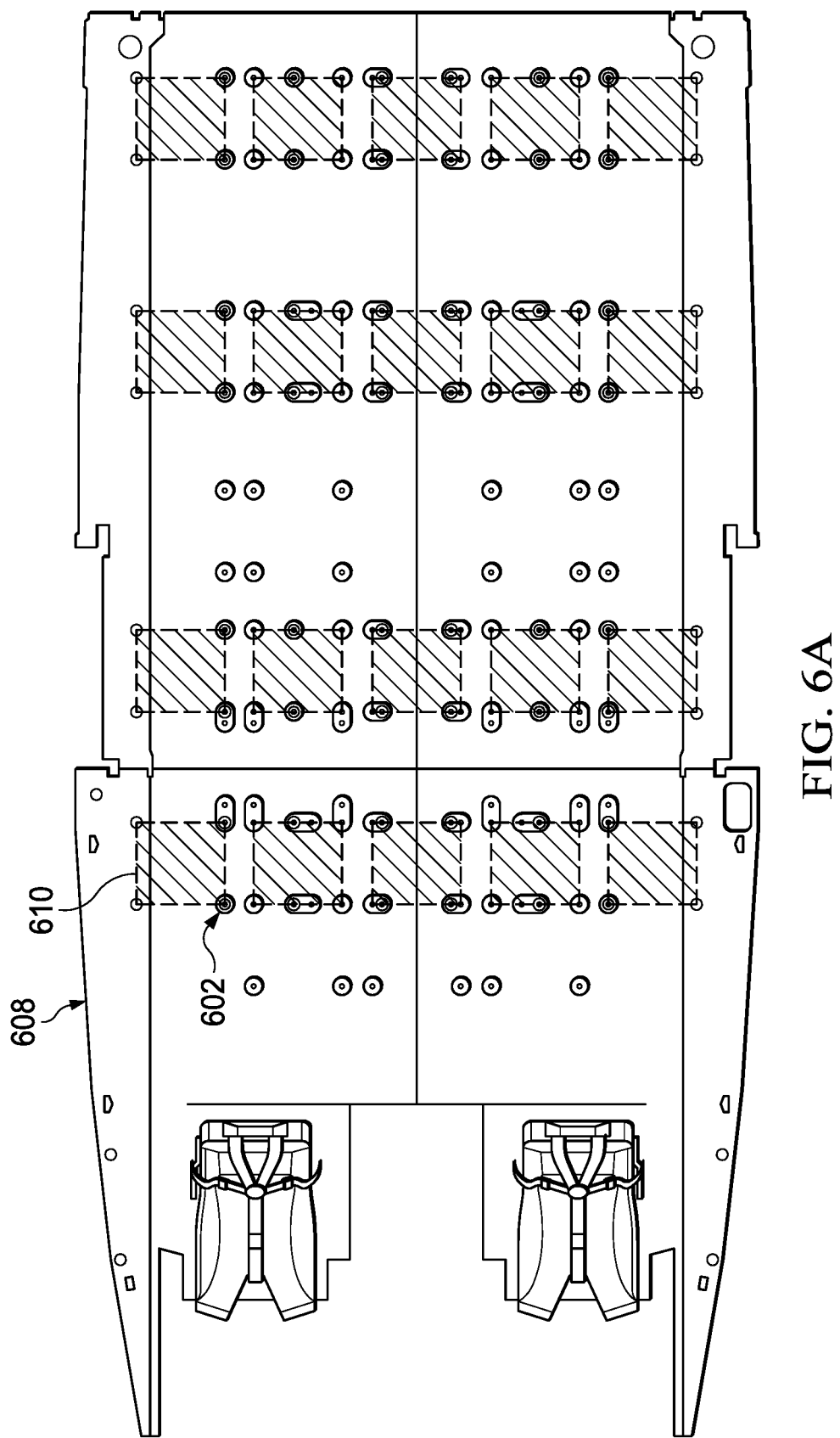
FIGS. 6A-B illustrate an example rotorcraft seating configuration for 20 passengers.
Figure 6B:
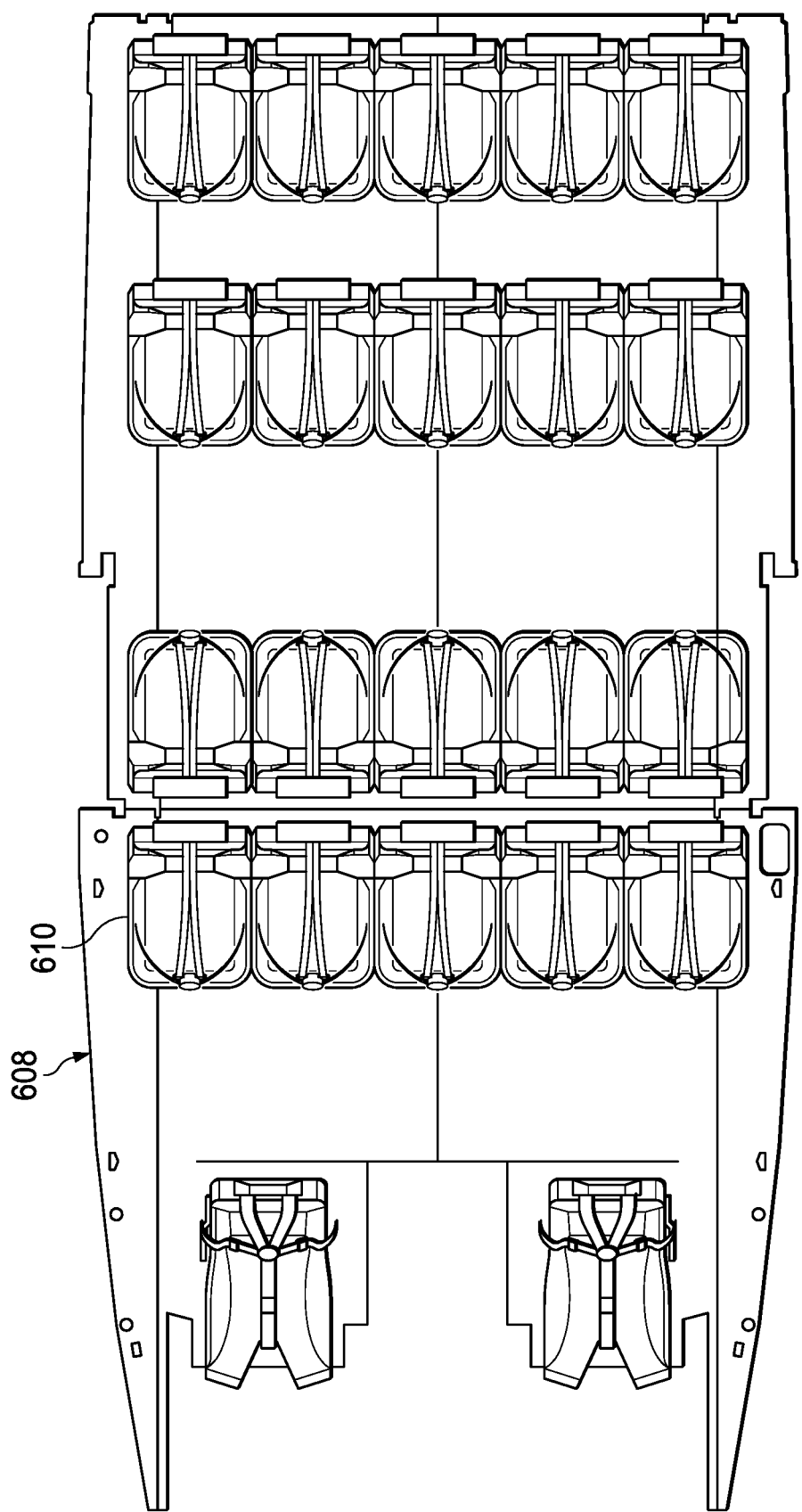

FIGS. 6A-B illustrate an example rotorcraft seating configuration for 20 passengers.

FIG. 6A illustrates the locations of pucks 602 installed in a rotorcraft floor 608 for a 20 passenger seating arrangement. The illustrated example identifies where the various pucks 602 are installed, where the seats 610 would be installed, and which pucks 602 (or other seat attachment provisions) would be used for each seat location 610. For example, the location of each seat 610 is indicated in the illustrated example by the overlay of seat locations 610 on the rotorcraft floor 608. Moreover, the particular pucks 602 used to attach each seat 610 is indicated in the illustrated example by the overlay of each seat location 610 on the corresponding pucks 602.

Moreover, the illustrated example indicates the type and orientation of each puck 602. For example, the type of each puck 602 is indicated in the illustrated example by the varying sizes and number of holes of the pucks 602 in rotorcraft floor 608 (e.g., similar to the various puck types illustrated in FIGS. 3A-C). Similarly, the orientation of each puck 602 in rotorcraft floor 608 is also depicted in the illustrated example.

In the illustrated example, a 20 passenger seating configuration could be installed by attaching four rows of seats 610, with five seats 610 per row, to the rotorcraft floor 608 using pucks 602 (and/or using other seat attachment mechanisms). For example, the various seats 610 of the 20 passenger seating configuration could be attached throughout the cabin floor 608 using the appropriate pucks 602 (and/or other seat attachment mechanisms) depicted by the illustrated example.

FIG. 6B illustrates an example seating arrangement for 20 passengers. The illustrated seating arrangement, for example, includes an arrangement of 20 seats 610 installed in rotorcraft floor 608 using the puck configuration of FIG. 6A. As shown in the illustrated example, there are four rows of seats 610 throughout the cabin floor 608 of the rotorcraft, and each row includes five adjacent seats 610. The seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other.

FIGS. 7A-I illustrate example corporate rotorcraft configurations. For example, the illustrated configurations of FIG. 7 can be used for corporate and/or VIP travel. Moreover, the example configurations of FIG. 7 may be installed using pucks (e.g., pucks 302 of FIGS. 3A-C).

Figure 7A:
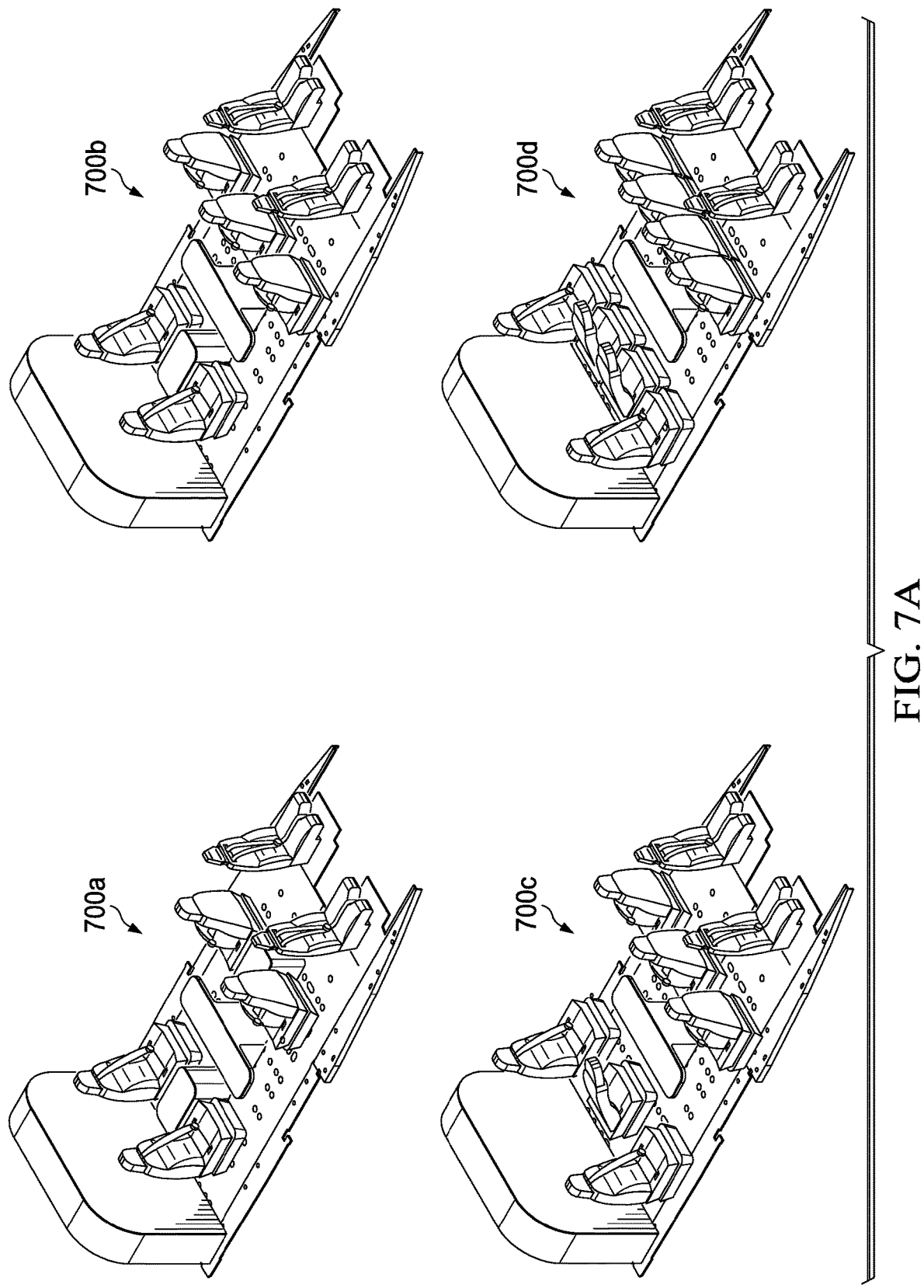
FIGS. 7A-I illustrate example corporate rotorcraft configurations.

FIG. 7A illustrates a three-dimensional perspective of various corporate seating and furniture configurations 700a-d that are described below in connection with the remaining illustrations of FIG. 7. For example, configuration 700a is a 4 passenger seating configuration, which is further illustrated and described in FIGS. 7B-C. Configuration 700b is a 5 passenger seating configuration, which is further illustrated and described in FIGS. 7D-E. Configuration 700c is a 6 passenger seating configuration, which is further illustrated and described in FIGS. 7F-G. Finally, configuration 700d is an 8 passenger seating configuration, which is further illustrated and described in FIGS. 7H-I.

Figure 7B:
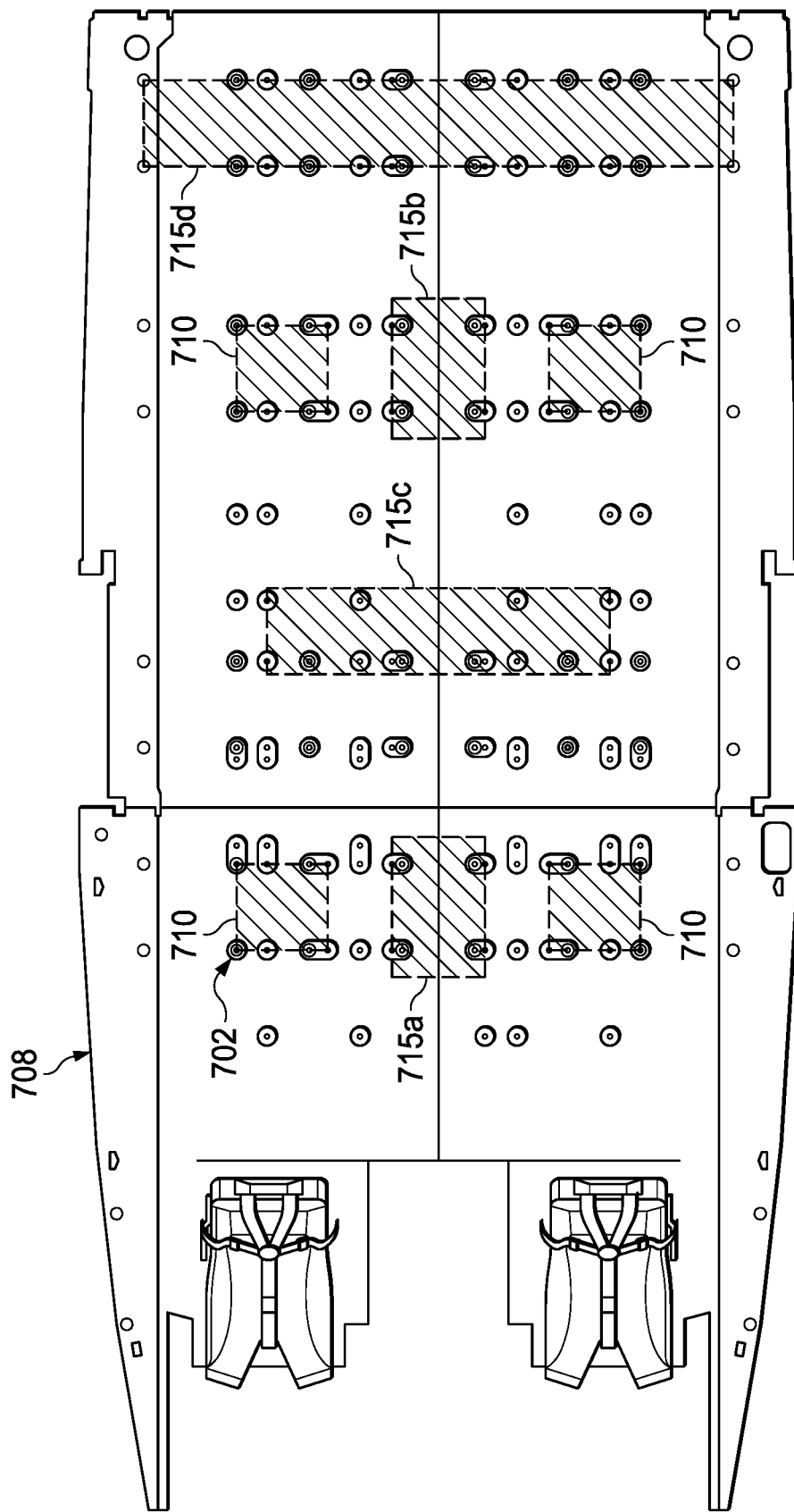

FIG. 7B illustrates the locations of pucks 702 installed in a rotorcraft floor 708 for a 4 passenger corporate arrangement. The illustrated example identifies where the various pucks 702 are installed, where the seats 710 and other furniture 715 would be installed, and which pucks 702 (or other seat attachment provisions) would be used for each seat 710 and furniture 715 location. For example, the location of each seat 710 and furniture piece 715 is indicated in the illustrated example by the overlay of seat 710 and furniture 715 locations on the rotorcraft floor 708. Moreover, the particular pucks 702 used to attach each seat 710 and furniture piece 715 is indicated in the illustrated example by the overlay of seat 710 and furniture 715 locations on the corresponding pucks 702.

Moreover, the illustrated example indicates the type and orientation of each puck 702. For example, the type of each puck 702 is indicated in the illustrated example by the varying sizes and number of holes of the pucks 702 in rotorcraft floor 708 (e.g., similar to the various puck types illustrated in FIGS. 3A-C). Similarly, the orientation of each puck 702 in rotorcraft floor 708 is also depicted in the illustrated example.

In the illustrated puck configuration, a 4 passenger seating configuration could be installed by attaching two rows of seats 710 with two seats 710 per row. Moreover, side tables 715a-b can be installed between the seats 710 of each row, a center table 715c can be installed between the two seat rows, and any desired fixture(s) 715d can be installed at the back of the rotorcraft (e.g., a storage or baggage compartment, cabinetry, beverage center, ice bins, and so forth). The seats 710 and furniture 715 can be attached to the rotorcraft floor 708 using the appropriate pucks 702 (and/or other seat attachment mechanisms) depicted by the illustrated example.

Figure 7C:
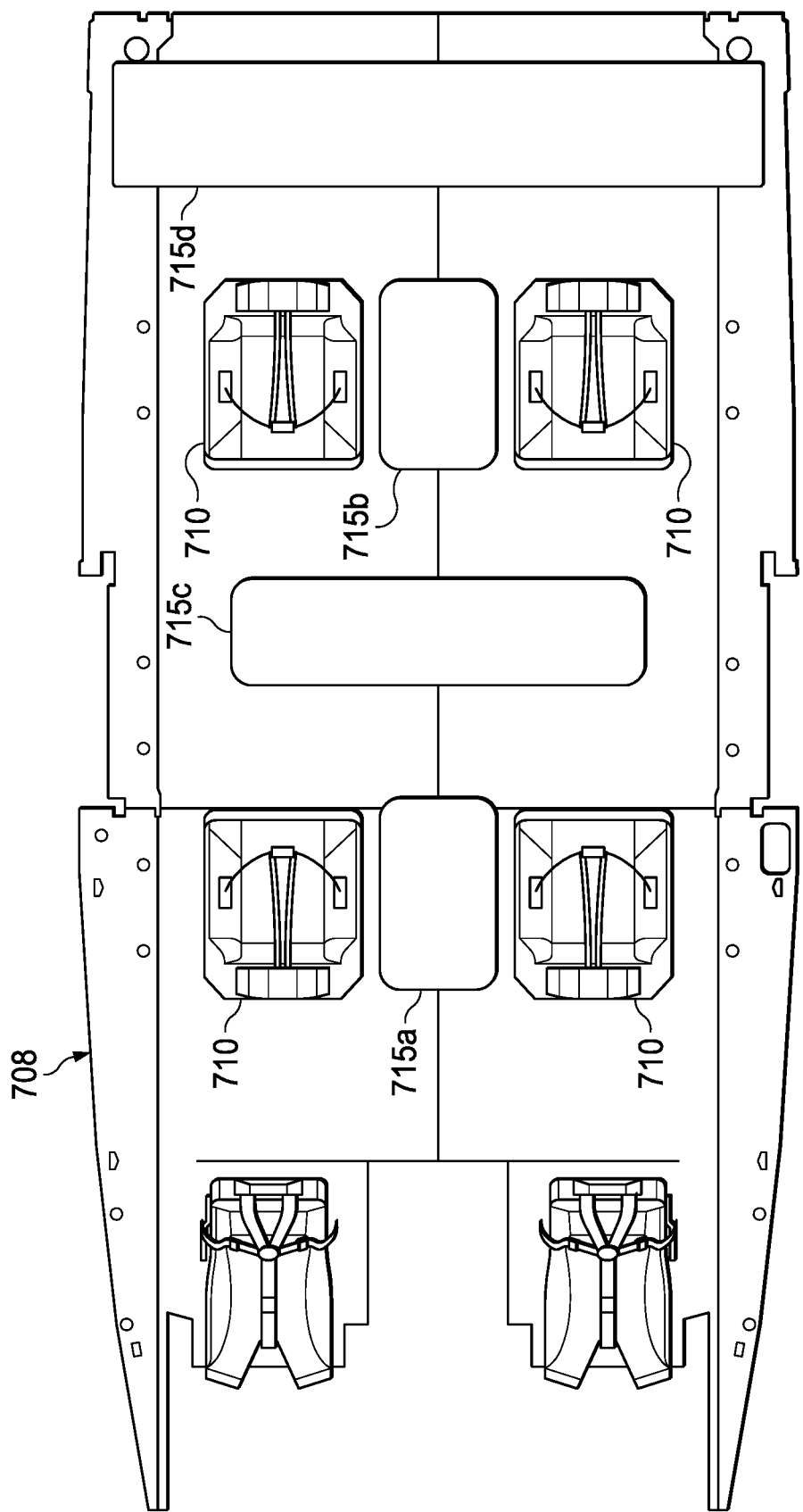

FIG. 7C illustrates an example corporate seating and furniture arrangement for a rotorcraft with 4 passengers. The illustrated corporate arrangement of FIG. 7C can be installed using the puck configuration of FIG. 7B. As shown in the illustrated example, there are two rows of seats 710 with two seats 710 per row, side tables 715a-b between the seats 710 of each row, a center table 715c between the two seat rows, and a storage compartment 715d (or other desired fixture) at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Figure 7D:
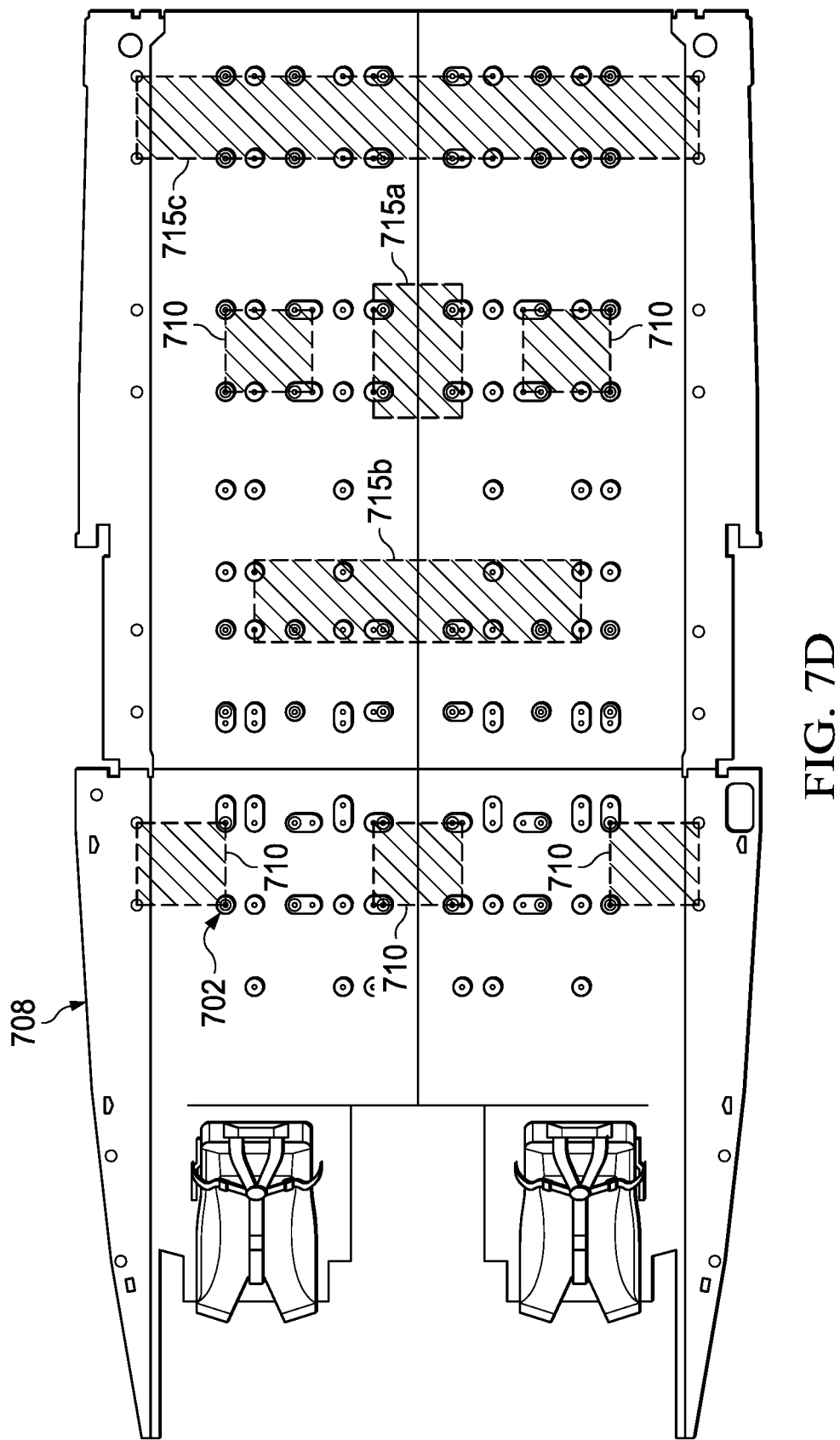

FIG. 7D illustrates the locations of pucks 702 installed in a rotorcraft floor 708 for a 5 passenger corporate arrangement. The illustrated example identifies where the various pucks 702 are installed, where the seats 710 and other furniture 715 would be installed, and which pucks 702 (or other seat attachment provisions) would be used for each seat 710 and furniture 715 location. For example, the location of each seat 710 and furniture piece 715 is indicated in the illustrated example by the overlay of seat 710 and furniture 715 locations on the rotorcraft floor 708. Moreover, the particular pucks 702 used to attach each seat 710 and furniture piece 715 is indicated in the illustrated example by the overlay of seat 710 and furniture 715 locations on the corresponding pucks 702.

Moreover, the illustrated example indicates the type and orientation of each puck 702. For example, the type of each puck 702 is indicated in the illustrated example by the varying sizes and number of holes of the pucks 702 in rotorcraft floor 708 (e.g., similar to the various puck types illustrated in FIGS. 3A-C). Similarly, the orientation of each puck 702 in rotorcraft floor 708 is also depicted in the illustrated example.

In the illustrated puck configuration, a 5 passenger seating configuration could be installed by attaching two rows of seats 710, with three seats in the $1^{st}$ row and two seats in the $2^{nd}$ row. Moreover, a side table 715a can be installed between the seats in the $2^{nd}$ row, a center table 715b can be installed between the seat rows, and a storage compartment 715c (or other desired fixture) can be installed at the back of the rotorcraft. The seats 710 and furniture 715 can be attached to the rotorcraft floor 708 using the appropriate pucks 702 (and/or other seat attachment mechanisms) depicted by the illustrated example.

Figure 7E:
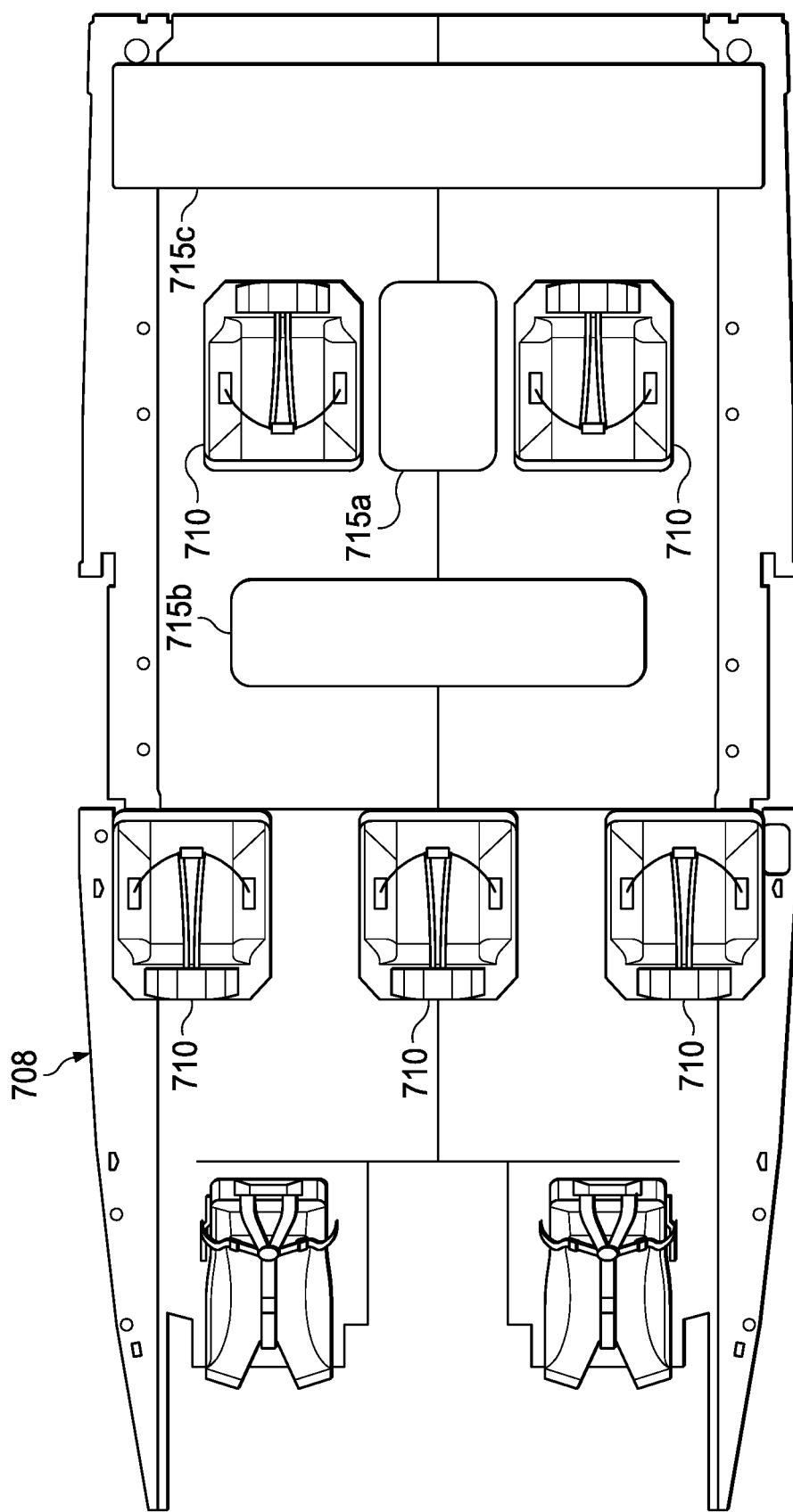

FIG. 7E illustrates an example corporate seating and furniture arrangement for a rotorcraft with 5 passengers. The illustrated corporate arrangement of FIG. 7E can be installed using the puck configuration of FIG. 7D. As shown in the illustrated example, there are two rows of seats 710, with three seats in the $1^{st}$ row and two seats in the $2^{nd}$ row, a side table 715a between the seats in the $2^{nd}$ row, a center table 715b between the seat rows, and a storage compartment 715c (or other desired fixture) at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Figure 7F:
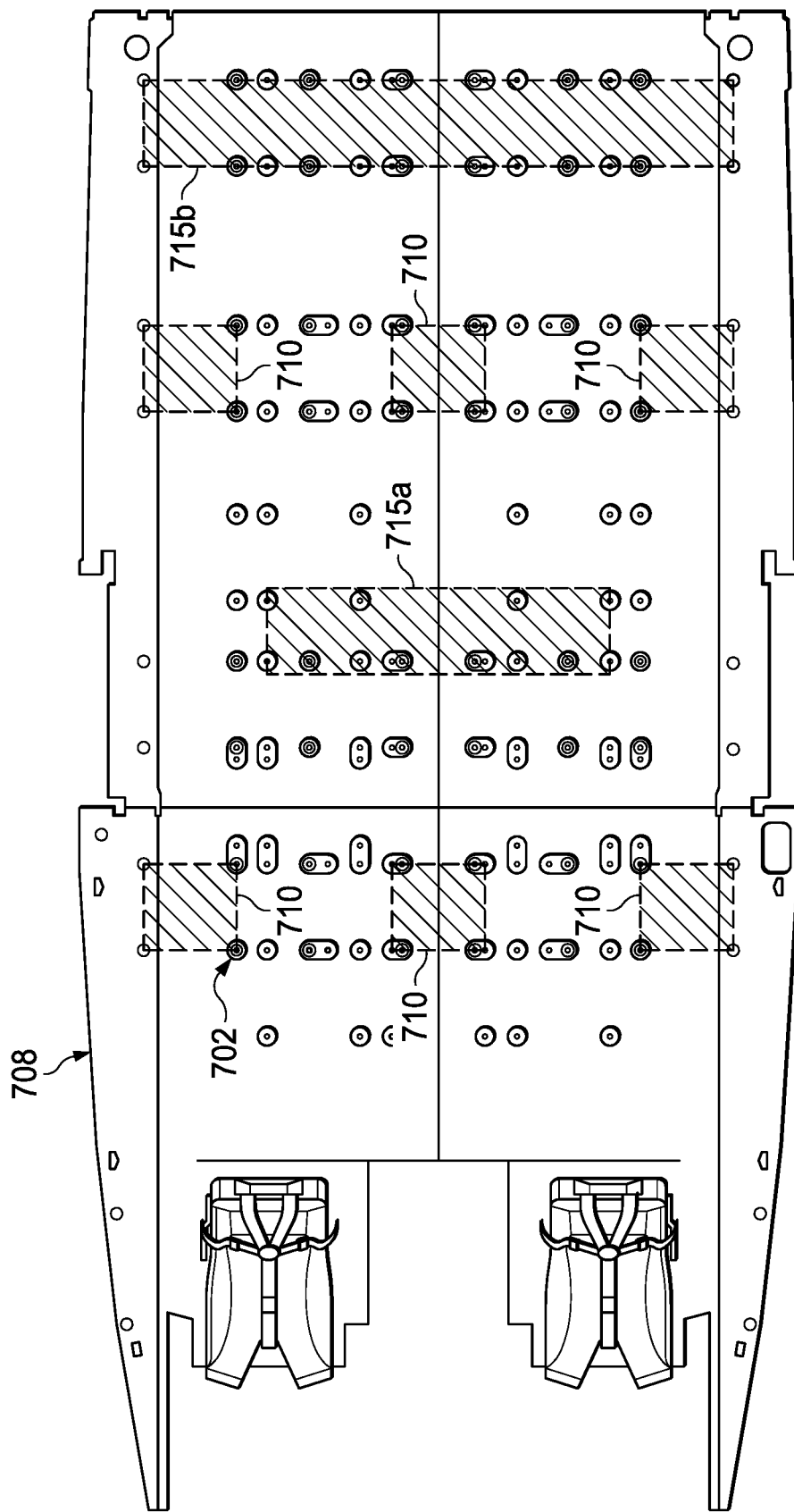

FIG. 7F illustrates the locations of pucks 702 installed in a rotorcraft floor 708 for a 6 passenger corporate arrangement. The illustrated example identifies where the various pucks 702 are installed, where the seats 710 and other furniture 715 would be installed, and which pucks 702 (or other seat attachment provisions) would be used for each seat 710 and furniture 715 location. For example, the location of each seat 710 and furniture piece 715 is indicated in the illustrated example by the overlay of seat 710 and furniture 715 locations on the rotorcraft floor 708. Moreover, the particular pucks 702 used to attach each seat 710 and furniture piece 715 is indicated in the illustrated example by the overlay of seat 710 and furniture 715 locations on the corresponding pucks 702.

Moreover, the illustrated example indicates the type and orientation of each puck 702. For example, the type of each puck 702 is indicated in the illustrated example by the varying sizes and number of holes of the pucks 702 in rotorcraft floor 708 (e.g., similar to the various puck types illustrated in FIGS. 3A-C). Similarly, the orientation of each puck 702 in rotorcraft floor 708 is also depicted in the illustrated example.

In the illustrated puck configuration, a 6 passenger seating configuration could be installed by attaching two rows of seats 710, with three seats per row. Moreover, a center table 715a can be installed between the seat rows, and a storage compartment 715b (or other desired fixture) can be installed at the back of the rotorcraft. The seats 710 and furniture 715 can be attached to the rotorcraft floor 708 using the appropriate pucks 702 (and/or other seat attachment mechanisms) depicted by the illustrated example.

Figure 7G:
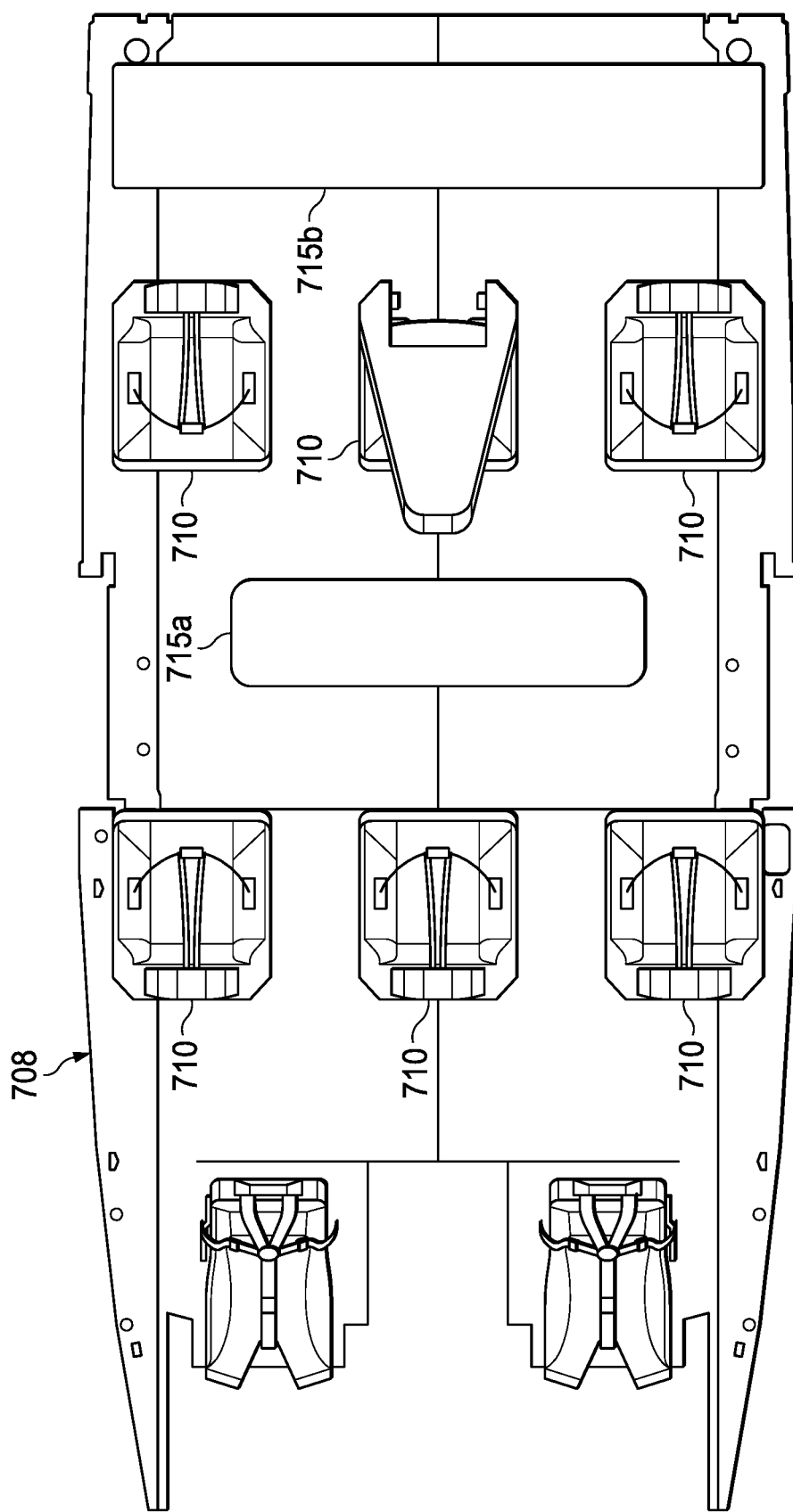

FIG. 7G illustrates an example corporate seating and furniture arrangement for a rotorcraft with 6 passengers. The illustrated corporate arrangement of FIG. 7G can be installed using the puck configuration of FIG. 7F. As shown in the illustrated example, there are two rows of seats 710, with three seats per row, a center table 715a between the seat rows, and a storage compartment 715b (or other desired fixture) at the back of the rotorcraft. Moreover, the center seat of the $2^{nd}$ row is a foldover seat, which may facilitate access to storage compartment 715b (or other desired fixture) at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Figure 7H:
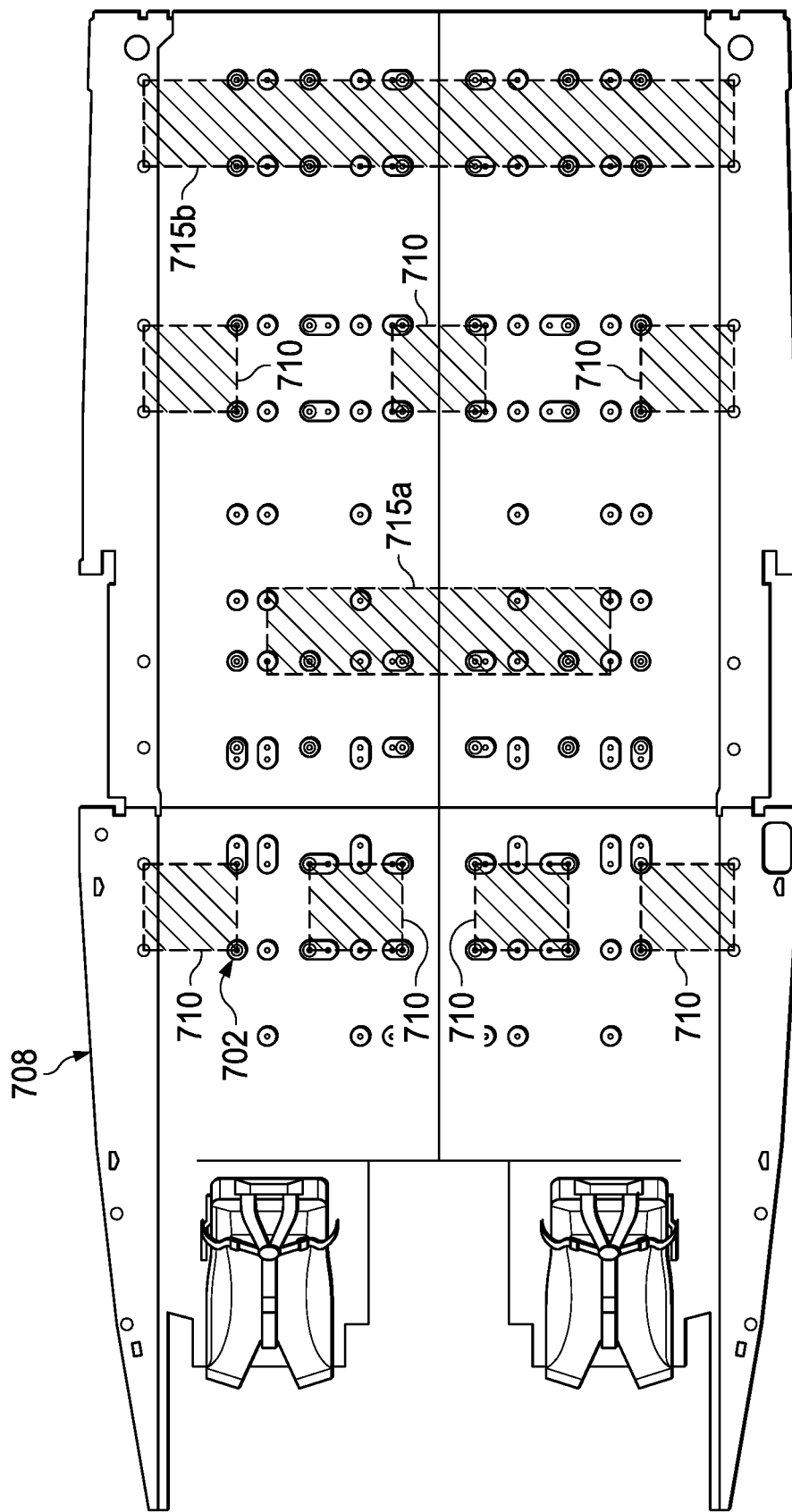

FIG. 7H illustrates the locations of pucks 702 installed in a rotorcraft floor 708 for an 8 passenger corporate arrangement. The illustrated example identifies where the various pucks 702 are installed, where the seats 710 and other furniture 715 would be installed, and which pucks 702 (or other seat attachment provisions) would be used for each seat 710 and furniture 715 location. For example, the location of each seat 710 and furniture piece 715 is indicated in the illustrated example by the overlay of seat 710 and furniture 715 locations on the rotorcraft floor 708. Moreover, the particular pucks 702 used to attach each seat 710 and furniture piece 715 is indicated in the illustrated example by the overlay of seat 710 and furniture 715 locations on the corresponding pucks 702.

Moreover, the illustrated example indicates the type and orientation of each puck 702. For example, the type of each puck 702 is indicated in the illustrated example by the varying sizes and number of holes of the pucks 702 in rotorcraft floor 708 (e.g., similar to the various puck types illustrated in FIGS. 3A-C). Similarly, the orientation of each puck 702 in rotorcraft floor 708 is also depicted in the illustrated example.

In the illustrated puck configuration, an 8 passenger seating configuration could be installed by attaching two rows of seats 710, with four seats per row. Moreover, a center table 715a can be installed between the seat rows, and a storage compartment 715b (or other desired fixture) can be installed at the back of the rotorcraft. The seats 710 and furniture 715 can be attached to the rotorcraft floor 708 using the appropriate pucks 702 (and/or other seat attachment mechanisms) depicted by the illustrated example.

Figure 7I:
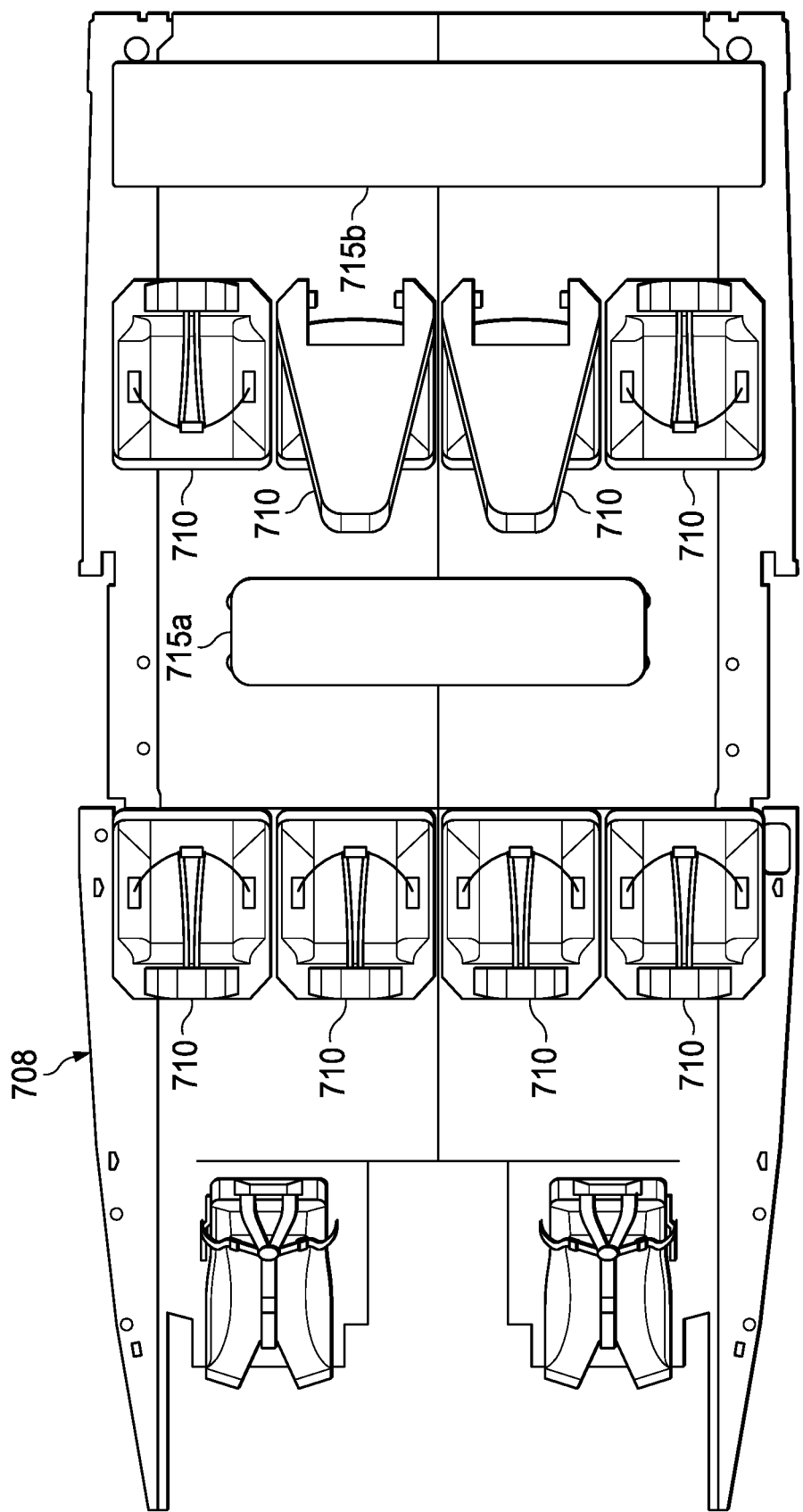

FIG. 7I illustrates an example corporate seating and furniture arrangement for a rotorcraft with 8 passengers. The illustrated corporate arrangement of FIG. 7I can be installed using the puck configuration of FIG. 7H. As shown in the illustrated example, there are two rows of seats 710, with four seats per row, a center table 715a between the seat rows, and a storage compartment 715b (or other desired fixture) at the back of the rotorcraft. Moreover, the two middle seats of the $2^{nd}$ row are foldover seats, which may facilitate access to storage compartment 715b at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Figure 8A:
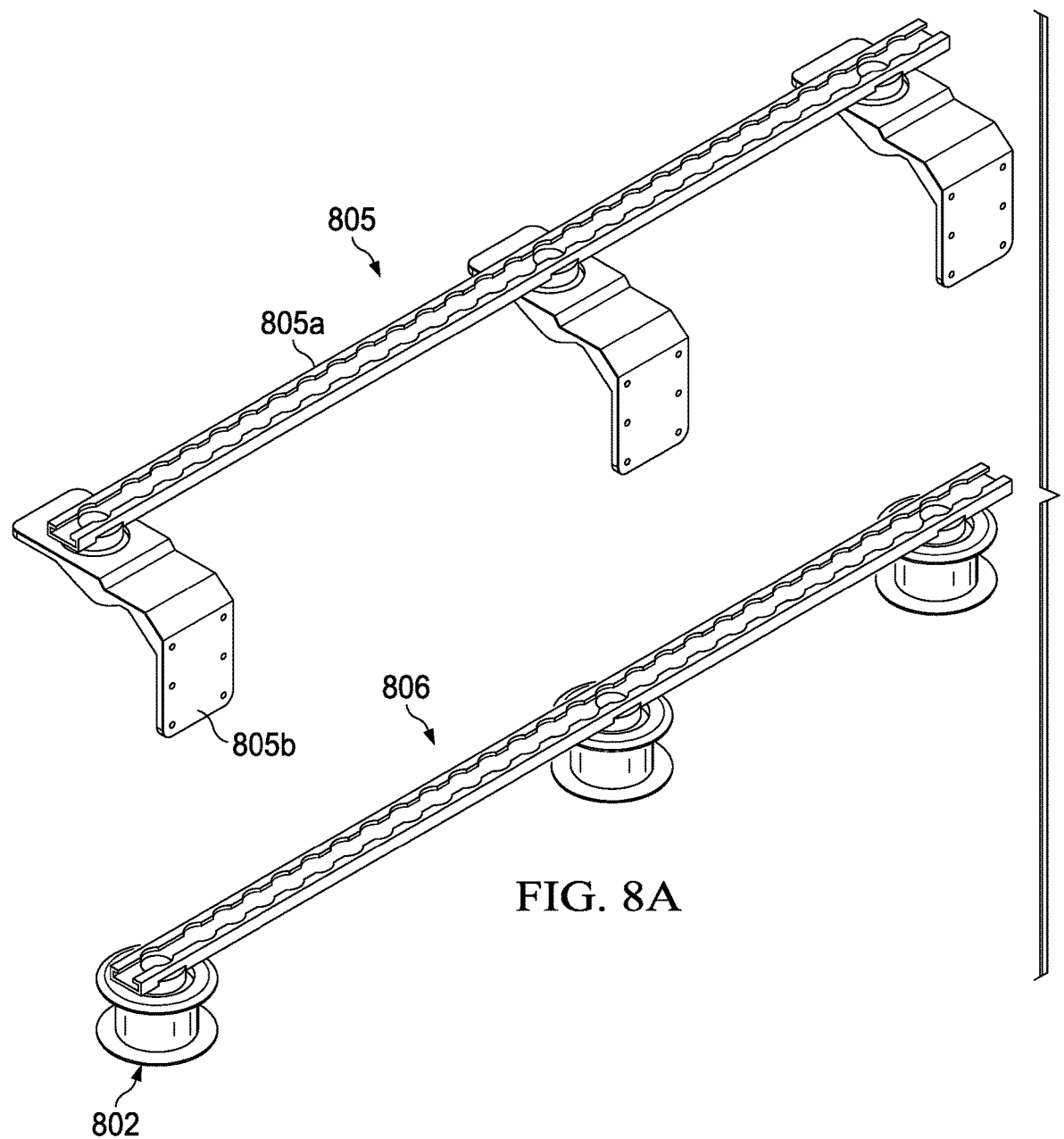
FIGS. 8A-C illustrate examples of puck-based adapter rails used for custom rotorcraft configurations.
Figure 8B:
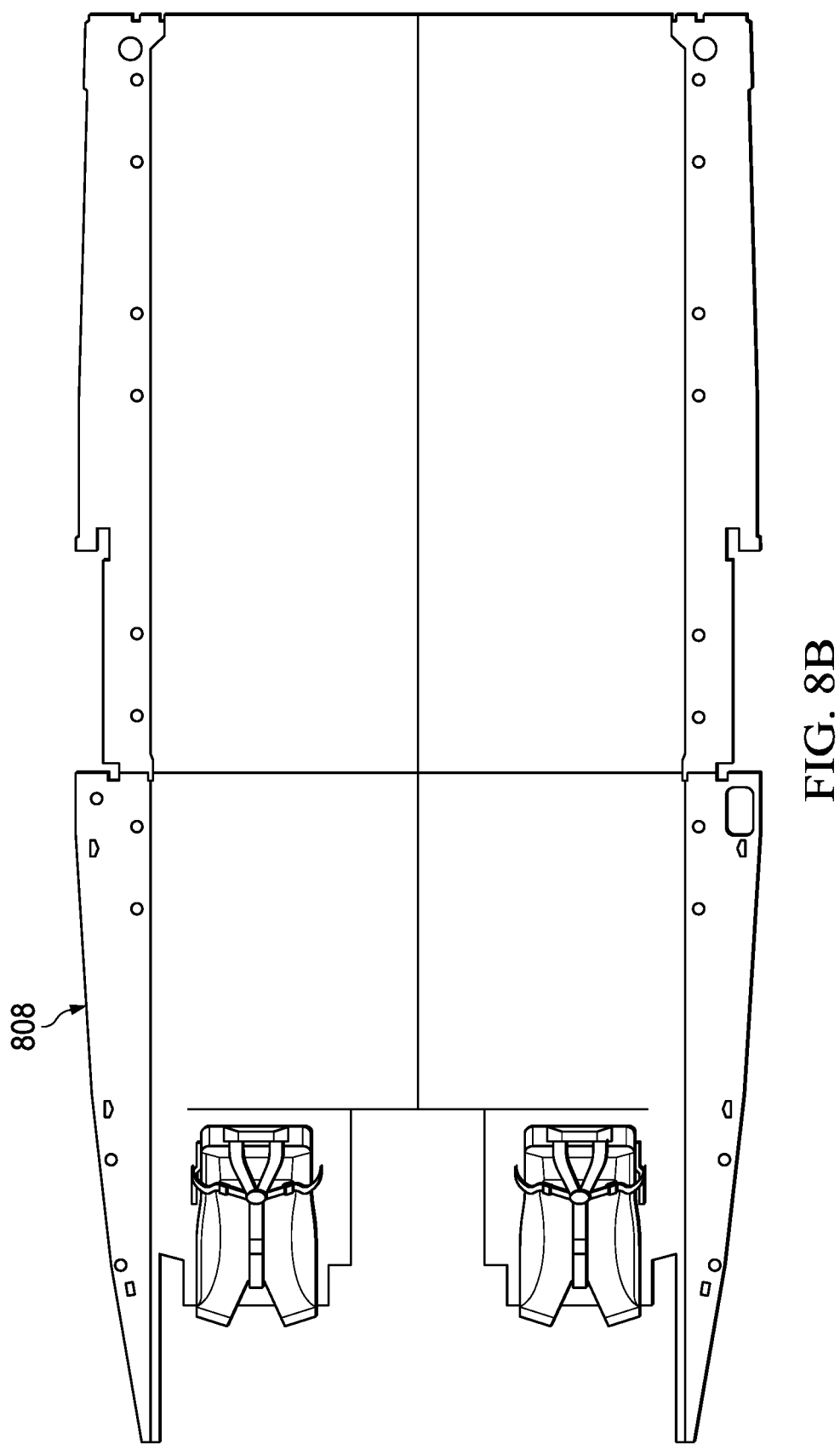
Figure 8C:
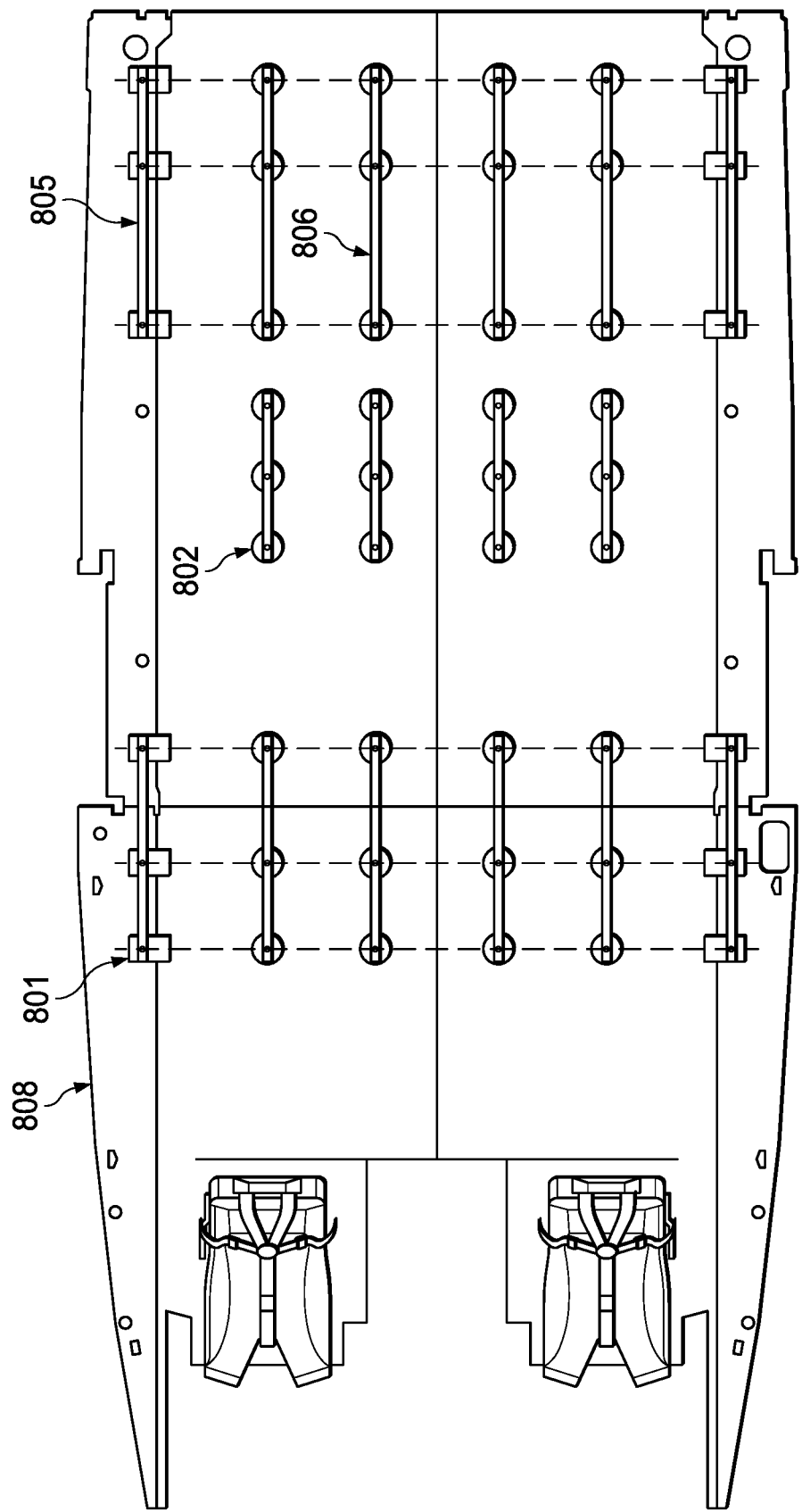

FIGS. 8A-C illustrate examples of puck-based adapter rails used for custom rotorcraft configurations. For example, certain aircraft fixtures may have attachment mechanisms that are designed for rail-based configurations rather than puck-based configurations. Thus, in some cases, fixtures designed for rail-based configurations may be incompatible with aircraft that use puck-based configurations. Accordingly, in some embodiments, puck-based adapter rails may be installed in aircraft with puck-based configurations, in order to attach aircraft fixtures designed for rail-based configurations. Puck-based adapter rails, for example, may be rail-based attachment mechanisms that can be installed using pucks. In this manner, fixtures designed for both puck-based configurations and rail-based configurations can be installed in aircraft that use puck-based configurations. Similarly, fixtures designed for any other type of attachment mechanism could also be installed in aircraft with puck-based configurations, using a corresponding puck-based adapter for the particular type of attachment mechanism used by those fixtures. In this manner, puck-based adapters can be used to implement custom rotorcraft fixture configurations using fixtures designed for various types of attachment mechanisms. For example, in some cases, custom rotorcraft configurations may be used for corporate and/or VIP travel, using any desired arrangement of fixtures (e.g., seats, tables, cabinets, storage compartments, beverage centers, desks, computer stands, beds, and so forth).

FIG. 8A illustrates example rail-based attachment mechanisms 805 and 806.

Rail-based attachment mechanism 805, for example, is a standalone attachment mechanism for rail-based fixtures that can be directly installed in an aircraft. Rail-based attachment mechanism 805 includes rail 805a and multiple rail mounting mechanisms 805b. Rail 805a can be mounted to a particular surface, such as an aircraft floor, using rail mounting mechanisms 805b. Rail 805a can then be used to attach fixtures that are designed for rail-based attachment configurations.

Rail-based attachment mechanism 806 is an attachment mechanism for rail-based fixtures that can be installed in an aircraft using pucks 802. For example, rail-based attachment mechanism 806 can be mounted on any surface that has a puck-based configuration, such as an aircraft floor installed with pucks 802. Rail 806 can then be used to attach fixtures that are designed for rail-based attachment configurations.

FIG. 8B illustrates a blank floor panel 808 for a rotorcraft that can be used for custom fixture configurations. Floor panel 808, for example, can be installed with any desired configuration of fixture attachment mechanisms, such as pucks, rails, and/or other attachment mechanisms, depending on the desired fixture configuration. Moreover, if floor panel 808 is installed with a puck-based configuration, puck-based adapters may be used in order to attach aircraft fixtures designed for other attachment mechanisms (e.g., rail-based mechanisms).

FIG. 8C illustrates an example rail-based configuration (and associated attachment points) in rotorcraft floor 808. The illustrated rail-based configuration, for example, can be used in a rotorcraft to provide a custom fixture configuration.

In the illustrated example, rotorcraft floor 808 includes existing seat provisions 801 and pucks 802. Existing seat provisions 801, for example, may be fixture attachment mechanisms that already exist in rotorcraft floor 808, such as seat attachment mechanisms that are installed during the manufacturing or fabrication stage of rotorcraft floor 808. Pucks 802 may be puck-based attachment mechanisms (e.g., pucks 302 of FIGS. 3A-C) used to enable flexible fixture arrangements, such as arrangements of seating and other furniture. In some cases, pucks 802 may be installed after the manufacturing or fabrication stage of rotorcraft floor 808. Moreover, the arrangement of seat pucks 802 installed in rotorcraft floor 808 may be varied based on the desired seating configuration of the rotorcraft operator. In some cases, other types of fixture attachment mechanisms may also be installed in rotorcraft floor 808 for certain fixture configurations.

In the illustrated example, rail-based attachment mechanisms are installed on rotorcraft floor 808 using existing seat provisions 801 and pucks 802. For example, the existing seat provisions 801 are used to install outboard rails 805 on the left and right edges of rotorcraft floor 808, while pucks 802 are used to install inboard rails 806 on the inner portion of rotorcraft floor 808. The outboard rails 805, for example, may be standalone rails (e.g., standalone rails 805 of FIG. 8A) installed directly on rotorcraft floor 808 using the existing seat provisions 801, while the inboard rails 806 may be puck-based adapter rails (e.g., puck-based adapter rails 806 of FIG. 8A) installed on rotorcraft floor 808 using pucks 802.

Once installed, rails 805 and 806 may be used to attach custom rail-based fixture configurations to rotorcraft floor 808, for example, for corporate or VIP travel.

Figure 9:
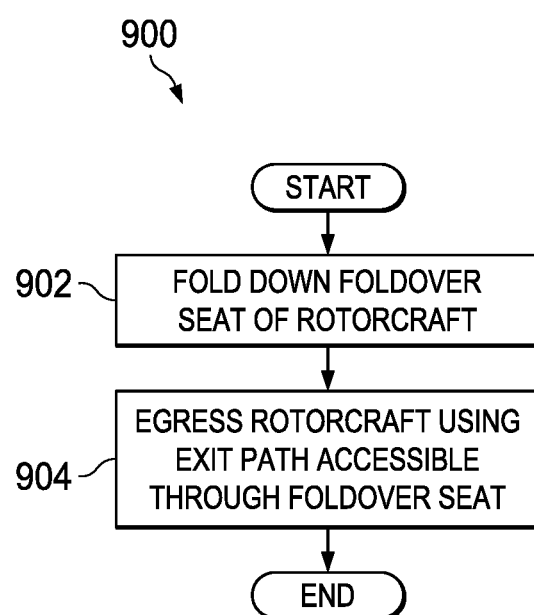
FIG. 9 illustrates a flowchart for an example embodiment of egressing a rotorcraft using foldover seats.

FIG. 9 illustrates a flowchart 900 for an example embodiment of egressing a rotorcraft using foldover seats. Flowchart 900 may be implemented, in some embodiments, using rotorcraft seating configurations described throughout this disclosure (e.g., the foldover seating configurations of FIGS. 5J and 5K).

The flowchart may begin at block 902 by folding down a foldover seat of a rotorcraft. In some embodiments, for example, the rotorcraft may comprise a plurality of seating rows, and the plurality of seating rows may comprise one or more foldover seats. A foldover seat, for example, may be placed in a particular seating row to facilitate access to an exit of the rotorcraft. In some embodiments, the foldover seat may be positioned at an end of a particular seating row.

For example, in some embodiments, 16-19 passenger seating arrangements may be implemented using four seating rows. Moreover, in order to facilitate access to one or more exits, one or more foldover seats may be placed throughout the seating rows, such as in the third seating row. A foldover seat in the third seating row, for example, may facilitate access to an exit from the third seating row. Alternatively, the foldover seat may facilitate access to an exit from a seating row adjacent to the third seating row, such as the second seating row or the fourth seating row. In some embodiments, the foldover seat may facilitate access to an exit located near the front, middle, or back of the rotorcraft.

The flowchart may then proceed to block 904, where the rotorcraft is egressed using a path to an exit that is accessible through a foldover seat when the foldover seat is folded down. For example, in some cases, the rotorcraft may be egressed from the particular seating row with the foldover seat, or from a seating row adjacent to the particular seating row with the foldover seat. Moreover, some embodiments may include a plurality of foldover seats. Thus, in those embodiments, multiple foldover seats may first be folded down, and the rotorcraft may then be egressed using a path to an exit that is accessible through the multiple foldover seats that are folded down.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft, comprising:
   a floor panel;
   one or more puck fasteners in the floor panel, wherein each puck fastener comprises:
      a body comprising a first cup-shaped portion and a second cup shaped portion, wherein the first cup-shaped portion comprises a first flat-bottomed flange and the second cup-shaped portion comprises a second flat-bottomed flange, wherein the first cup shaped portion and the second cup shaped portion are separable, the first flange and the second flange are coupled together when the puck fastener is embedded in the floor panel such that the flat bottom of the first flange abuts the flat bottom of the second flange, and the first cup-shaped portion further comprises a third flange and the second cup-shaped portion further comprises a fourth flange, the third and fourth flanges being configured to engage with opposing outer surfaces of the floor panel when the puck fastener is installed in the floor panel, wherein the third and fourth flanges extend at 90 degrees to a longitudinal axis of the puck fastener and are circumferentially continuous; and
      an attachment fitting for coupling a component to the floor panel in which the attachment device is embedded; and
   a fixture coupled to the floor panel using the one or more puck fasteners.

2. The aircraft of claim 1, wherein the aircraft comprises a rotorcraft.

3. The aircraft of claim 1, wherein the floor panel of the aircraft is removable.

4. The aircraft of claim 1, wherein the one or more puck fasteners are embedded in a baggage bay of the aircraft.

5. The aircraft of claim 1, wherein the fixture comprises a seat for the aircraft.

6. The aircraft of claim 1, wherein the fixture comprises a table for the aircraft.

7. The apparatus of claim 1, wherein the first portion comprises a first rim disposed on top end thereof and the second portion comprises a second rim on a bottom end thereof to provide structural support when the attachment device is used to couple the component to the panel.

8. The apparatus of claim 1, wherein the first portion and the second portion are separable.

9. The apparatus of claim 1, wherein the attachment device further comprises a plurality of attachment fittings.

10. The apparatus of claim 1, wherein the attachment device is configured to be embedded in the panel after the panel is manufactured.

11. The apparatus of claim 1, wherein the panel comprises a composite core.

12. The apparatus of claim 1, wherein the attachment device further comprises an adapter for attaching a fixture that is incompatible with the attachment fitting of the attachment device.

13. The apparatus of claim 12, wherein the adapter comprises an adapter rail for attaching a rail-based fixture.

14. The apparatus of claim 1, further comprising a plug for covering the attachment device when the attachment device is unused, wherein the plug is configured to be embedded flush with the panel in which the attachment device is embedded.

15. The apparatus of claim 1, wherein the component comprises a fixture for an aircraft.

16. The apparatus of claim 1, wherein the attachment device is a puck-based attachment device.

17. An apparatus, comprising:
a panel of an aircraft; and
one or more puck fasteners for attaching a fixture to the panel, wherein each puck fastener comprises:
a body comprising a first cup-shaped portion and a second cup shaped portion, wherein the first cup-shaped portion comprises a first flat-bottomed flange and the second cup-shaped portion comprises a second flat-bottomed flange, wherein the first cup shaped portion and the second cup shaped portion are separable, the first flange and the second flange are coupled together when the puck fastener is embedded in the panel such that the flat bottom of the first flange abuts the flat bottom of the second flange, and the first cup-shaped portion further comprises a third flange and the second cup-shaped portion further comprises a fourth flange, the third and fourth flanges being configured to engage with opposing outer surfaces of the panel when the puck fastener is installed in the panel, wherein the third and fourth flanges extend at 90 degrees to a longitudinal axis of the puck fastener and are circumferentially continuous; and
an attachment fitting for coupling a component to the panel in which the puck fastener is embedded.

18. The apparatus of claim 17, wherein the panel comprises an exterior panel of the aircraft.

19. The apparatus of claim 18, wherein the fixture comprises a cargo net.

* * * * *